United States Patent [19]
Mano et al.

[11] Patent Number: 5,109,406
[45] Date of Patent: Apr. 28, 1992

[54] CALL CONTROL METHOD AND APPARATUS FOR A SWITCHING SYSTEM

[75] Inventors: Hiroshi Mano; Iwao Hasegawa, both of Hino; Koichiro Yabu, Tama, all of Japan

[73] Assignee: Kabushiki Kaisha Toshiba, Kanagawa, Japan

[21] Appl. No.: 351,296

[22] Filed: May 11, 1989

Related U.S. Application Data

[63] Continuation of Ser. No. 883,642, Jul. 9, 1986, abandoned.

[30] Foreign Application Priority Data

| Sep. 30, 1985 | [JP] | Japan | 60-218331 |
| Mar. 26, 1986 | [JP] | Japan | 61-73322 |
| Sep. 30, 1986 | [JP] | Japan | 61-67955 |

[51] Int. Cl.$^5$ ............................................... H04M 11/00
[52] U.S. Cl. ...................................... 379/94; 379/216; 379/93
[58] Field of Search .................. 379/94, 216, 93, 54

[56] References Cited

U.S. PATENT DOCUMENTS

| 3,573,377 | 4/1971 | Anderson et al. | 379/54 |
| 4,291,200 | 9/1981 | Smith | 379/94 |
| 4,513,377 | 7/1985 | Zink | 379/94 |
| 4,535,198 | 8/1985 | Squicciarini | 379/94 |
| 4,535,199 | 8/1985 | Zink | 379/94 |
| 4,607,364 | 8/1986 | Neumann et al. | 370/99 |
| 4,654,866 | 3/1987 | Bottle et al. | 379/54 |

FOREIGN PATENT DOCUMENTS

| 0166851 | 10/1983 | Japan | 379/94 |
| 0166860 | 10/1983 | Japan | 379/94 |
| 0200667 | 10/1985 | Japan | 379/94 |

OTHER PUBLICATIONS

Gupta et al., "The SL-1PBX", Telesis, pp. 28-34, 1984.
Reinius et al., "DIAVOX Courier 700", Ericsson, Review No. 2, pp. 58-66, 1982.
Boleda et al., "The Architecture of Meridian Sl. Integrated Services Network", pp. 26-33, Telesis 1985-Two.

Primary Examiner—James L. Dwyer
Assistant Examiner—Stella L. Woo
Attorney, Agent, or Firm—Banner, Birch, McKie & Beckett

[57] ABSTRACT

A communication switching system is disclosed which includes a plurality of telephone sets and data terminals connected to an exchange. The data terminals have corresponding telephone sets. Other telephone sets operate independently. Information regarding the correspondence of the data terminals to the telephone sets is stored in the exchange. The telephone sets related to the data terminals initiate connection through the exchange of one data terminal to another data terminal. The telephone sets control the connection by the exchange using a two key sequence. The exchange controls the connection in accordance with data terminal/telephone set corresondence data stored in the exchange.

14 Claims, 14 Drawing Sheets

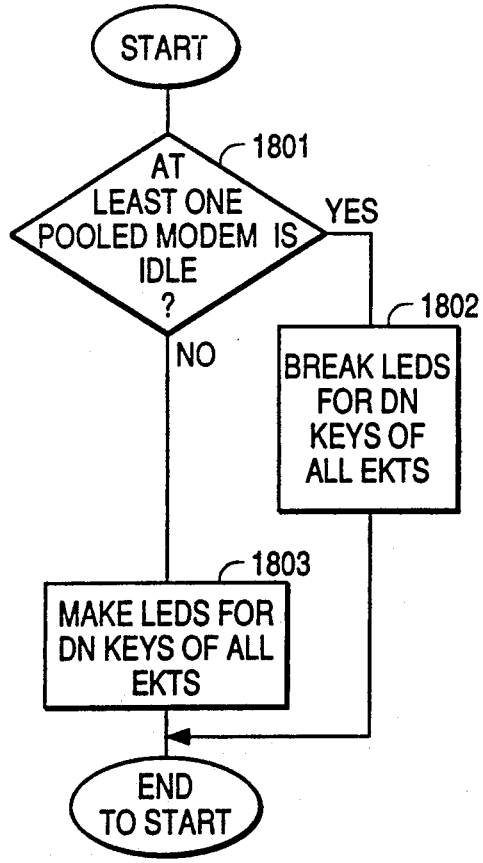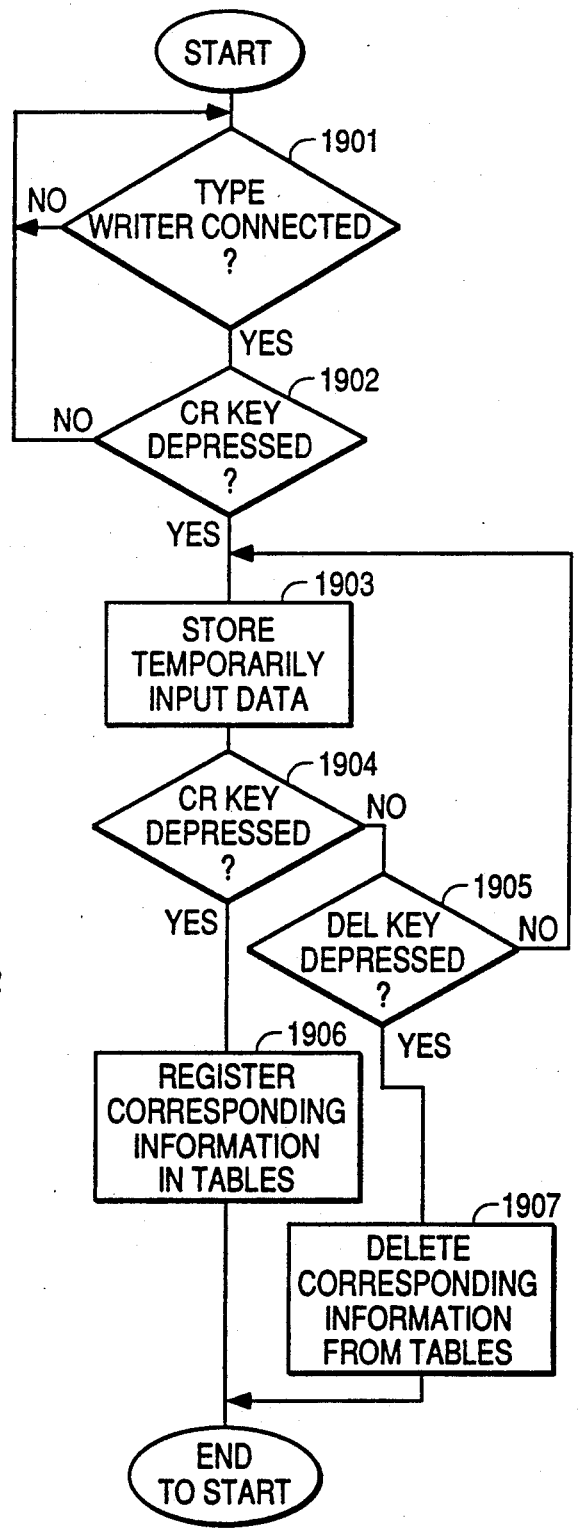

CALL CONTROL METHOD AND APPARATUS FOR A SWITCHING SYSTEM

This application is a continuation of application Ser. No. 883,642, filed Jul. 9, 1986 now abandoned.

BACKGROUND OF THE INVENTION

This invention is generally directed to the field of switching systems, and more particularly relates to an improved method of call control in a telephone switching system and to an improved telephone switching system.

There has been rapid developments in telephone switching systems in recent years. Many such conventional telephone switching systems operate to selectively connect not only telephone sets but also data terminals to a plurality of other telephone sets and data terminals. Generally, the exchange for the switching system begins a call sequence by selectively connecting a calling terminal (telephone set or data terminal) to a called terminal as designated by the calling terminal. The called terminals respond accordingly to the exchange to complete the connection. The exchange also disconnects the connection in accordance with the request of either terminal to end or finish the call. Therefore, each terminal is required to convey several types of commands to the exchange. Typically, when the user, e.g., picks up a telephone handset, dials a telephone number to make a call and then hangs up, the call request, the designation of the called party and the call completion are all conveyed to the exchange. Also, when the called party picks up the phone to answer the call, an answer response is conveyed to the exchange.

The above call procedures are also followed when data terminals are used, although some communications are conveyed to the exchange automatically while others are in response to manual operation by the user. To convey the various commands and other communications between data terminals and the exchange, a data interface unit is interposed between the exchange and the terminal. The interface unit is sometimes called a data service unit, a data control unit, a network control unit, or the like. In the present specification, the interface unit will be referred to as a data interface unit or DIU. Regardless of the nomenclature, the DIU serves at least the minimum purpose of conveying call request and response information to the exchange.

In more cases, each user has his own telephone set and in some cases the users has his own data terminal as well. Thus, a telephone set and a DIU for the data terminal are often located in the same place, e.g., on a desk. Therefore, the user has to provide space not only for the telephone set but also for the data interface unit and the data terminal. The space occupied by the data interface unit can be a relatively large space because it usually has several keys and a dial pad, for instance, for its operation. In addition, the user is required to operate both the telephone set and the data interface unit. Moreover, data interface units are relatively expensive, resulting in an overall increase in the cost of the entire system.

SUMMARY OF THE INVENTION

It is therefore an object of the present invention to provide a method of call control in a switching system which requires less space for data interface units than such systems known in the prior art.

It is another object of the present invention to provide an improved switching system which permits the operation of a connected telephone set when a user makes a call for a data terminal.

According to the present invention, and in order to realize the above objects, a switching system is provided which includes an exchange with an exchange switch and a plurality of telephone sets and data terminals coupled to the exchange. The exchange is provided with a memory for storing information relating to telephone sets and respective data terminals, a controller for transmitting control data regarding a call from the telephone set to the exchange for an associated data terminal and another controller for controlling the connection of data terminals to the exchange in accordance with stored information upon receipt of the control data. Thus, the user is permitted to operate a telephone set for making a data communication call. Moreover, the size of the data interface unit of the data terminal is markedly reduced in comparison to such units known in the art.

BRIEF DESCRIPTION OF THE DRAWINGS

FIG. 18 is a flow chart of a computer program executed by CPU 192 shown in FIG. 3 along with the flow chart shown in FIG. 17.

FIG. 19 is a flow chart of a computer program executed by CPU 192 shown in FIG. 3 for inputting and deleting informations regarding correspondence between EKTs and DIUs shown in FIG. 3.

DETAILED DESCRIPTION OF THE PREFERRED EMBODIMENTS

Figure 1:
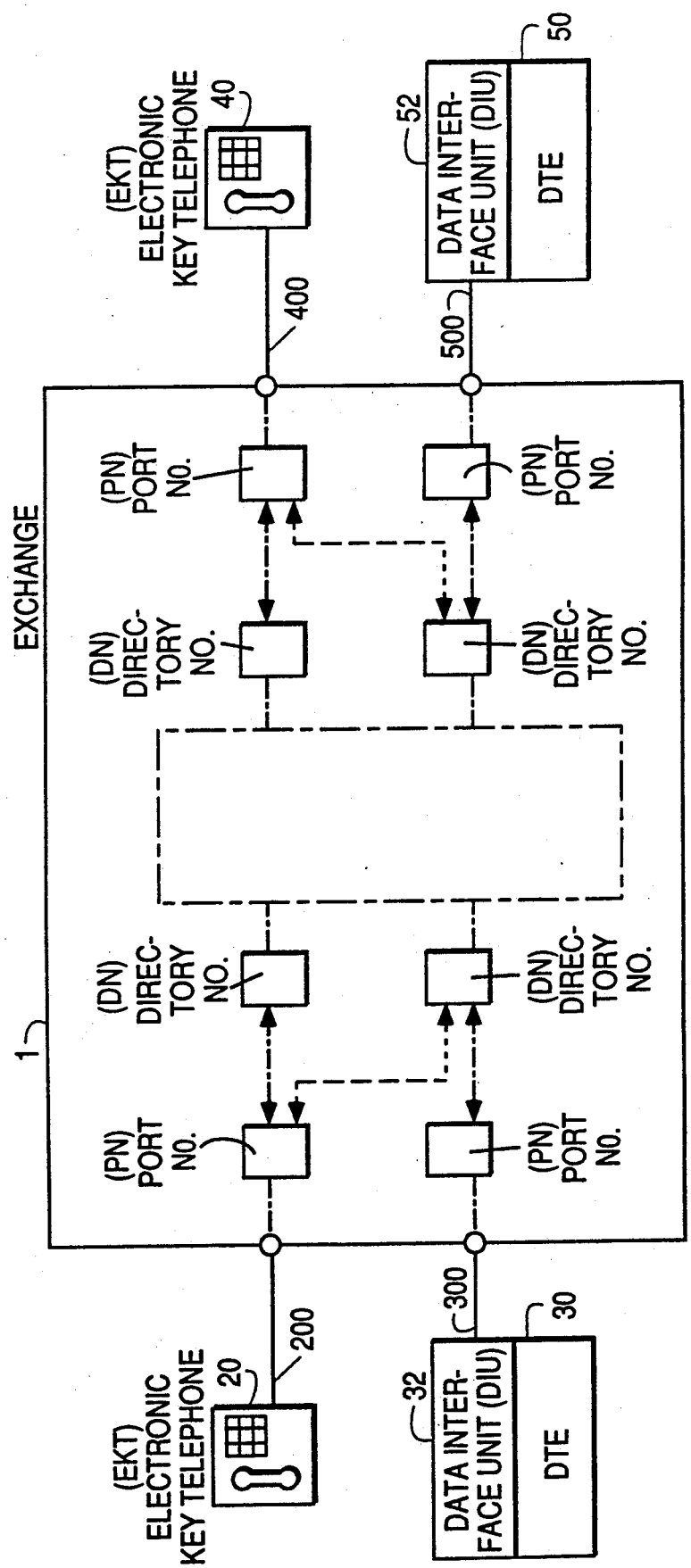
FIG. 1 is a general block diagram illustrating one embodiment of the present invention.
Figure 6:
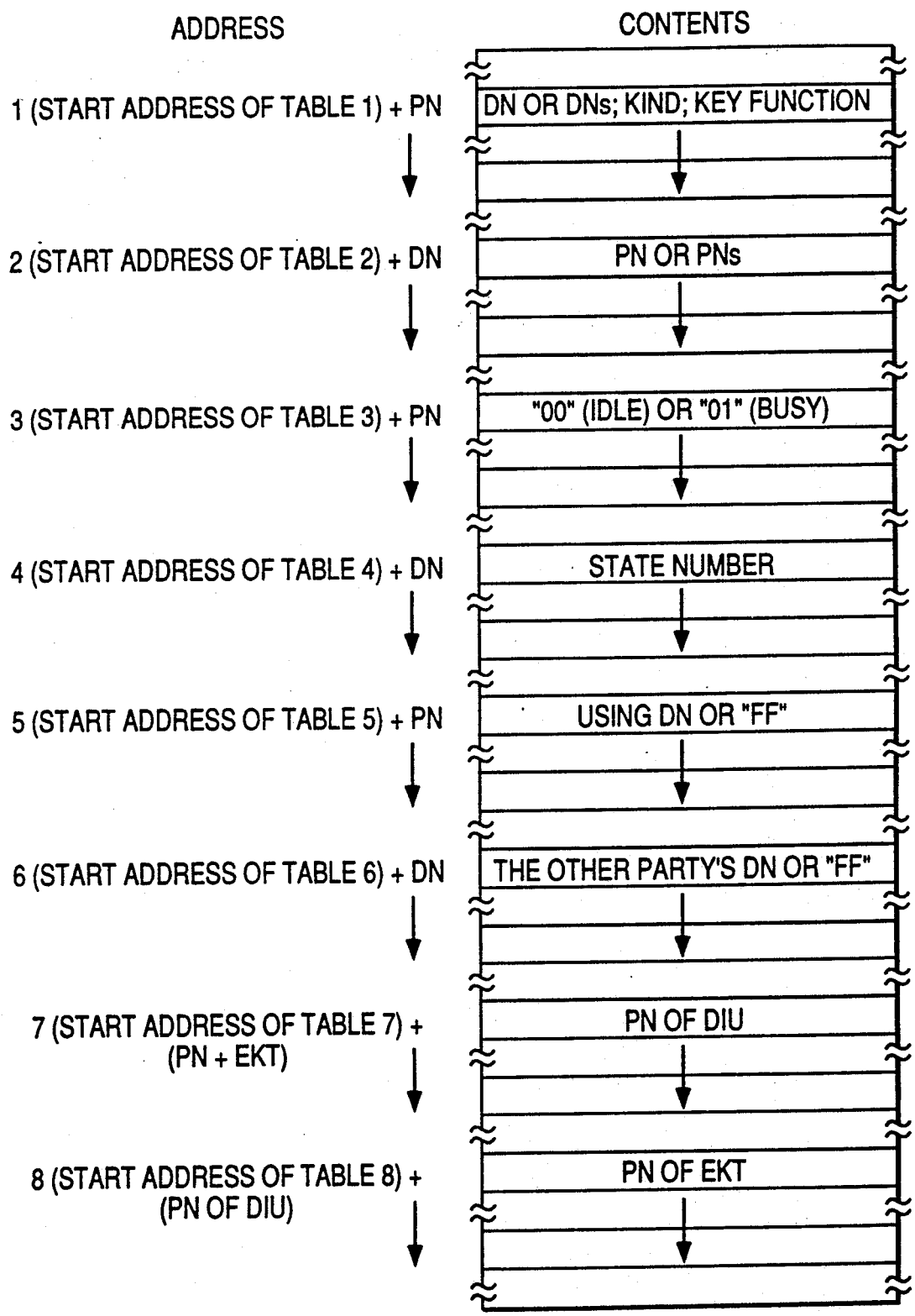
FIG. 6 is an illustration of tables 1 through 8 stored in RAM 196 shown in FIG. 3.

FIG. 1 is an illustration of one embodiment of the present embodiment showing an exchange 1 which includes an exchange switch to which telephone sets, e.g., electronic key telephone sets (EKTs) 20, 40, and data terminals (DTEs) 30, 50 are coupled to the exchange by respective extension lines. Although only two EKTs 20 and 40 and two DTEs 30 and 50 are shown in FIG. 1, a plurality of such telephone sets and data terminals may be coupled to exchange 1. Each extension line 200, 400, 300 and 500 for coupling EKTs 20 and 40 and DTEs 30 and 50 are connected to respective connecting points on the exchange. Each connecting point is called a port. The exchange receives control data from an EKT signalling a request to make a call to a designated called party through a corresponding port. The exchange is required to determine which port the called party i.e., called EKT, is connected to from the control data. The exchange accomplishes this task by using a stored look up table referred to herein as a DN-PN (directory number-port number) table. The DN-PN table is graphically shown in FIG. 6 as table 2. The table, as well as the other tables shown in FIG. 6, is stored in memory within the exchange and may be set up where the start address of the table is predetermined and the directory number serves as a pointer which is added to the start address. The memory address thus pointed to holds the associated port number. Each of the tables shown in FIG. 6 may be set up in a similar manner using different parameters as a pointer as set forth below.

The directory number of the called EKT is provided to the exchange by the calling EKT and is associated in the DN-PN table with the exchange port to which the called EKT is connected. After the port number (PN) of the called EKT is determined the exchange connects the calling EKT to the called EKT through the proper port.

In addition to the DN-PN table, the exchange also has a port number-directory number (PN-DN) table in order to make it possible to cross-reference numbers. The PN-DN table is illustrated by table 1 in FIG. 6. This table may also include the type of telephone or data terminal which is connected to the port and the functions provided by any function keys on the telephone or terminal. The exchange further has a port number (PN) state table to indicate whether a relevant port is busy and a directory number (DN) state table in which the state of each directory number is maintained as a call progresses. The PN state table and the DN state table are illustrated by tables 3 and 4, respectively, in FIG. 6. The various directory number states include "idle", "sending dial tone to", "receiving address signal from", "called party ringing", "connected", "sending busy tone to", "sending ringing tone to" and so forth. Each state is written in the form of state number, e.g. "0", "1", "2", "3", "4", "5", "6" and so forth as an incoming call is processed by the exchange in a plurality of steps, each corresponding to directory number state. For example, when a EKT hand set is picked up, the exchange changes the call state of the associated directory number (DN state, hereinafter) from "0" to "1", and causes a dial tone to be sent to the EKT.

According to the present invention, a memory is provided within the exchange for storing information which relates each EKT to its respective data terminals, although this correspondence is not necessarily a one-to-one correspondence. Thus a plurality of data terminals may be associated with a particular EKT.

With reference again to FIG. 1, EKTs 20 and 40 are regarded as being related to data terminals 30 and 50 which are coupled to exchange 1 through data interface units (DIUs) 32 and 52, respectively. A PN of DIU table is also illustrated in FIG. 6 as table 8. This table provides the port number of an associated EKT which corresponds to the port number of the data interface unit. A PN of EKT table is illustrated in FIG. 6 as table 7. This table provides the port number of an associated data interface unit which corresponds to the port number of the EKT.

EKTs 20 and 40 are related to data terminal 30 and 50, respectively, and operate to transmit control data to the exchange to make or start a data call, to select or designate a called data terminal and to end or complete the call with respect to the related data interface 32 and 52. When the exchange receives this control data from the related EKT, it recognizes that the control data is for a related DIU as a result of a reference to table 7 (PN of EKT). The exchange then refers to table 1 to determine which directory number (DN) is associated with the port number for the DIU (PN of DIU) and changes the state of that DN in DN state table 4. This referring process is shown by the dotted line in FIG. 1. Thus, the request conveyed by the EKT for its related DIU is treated as if it is conveyed from the DIU itself. This is a basic concept of call control for data communication in this embodiment of the present invention.

Figure 2:
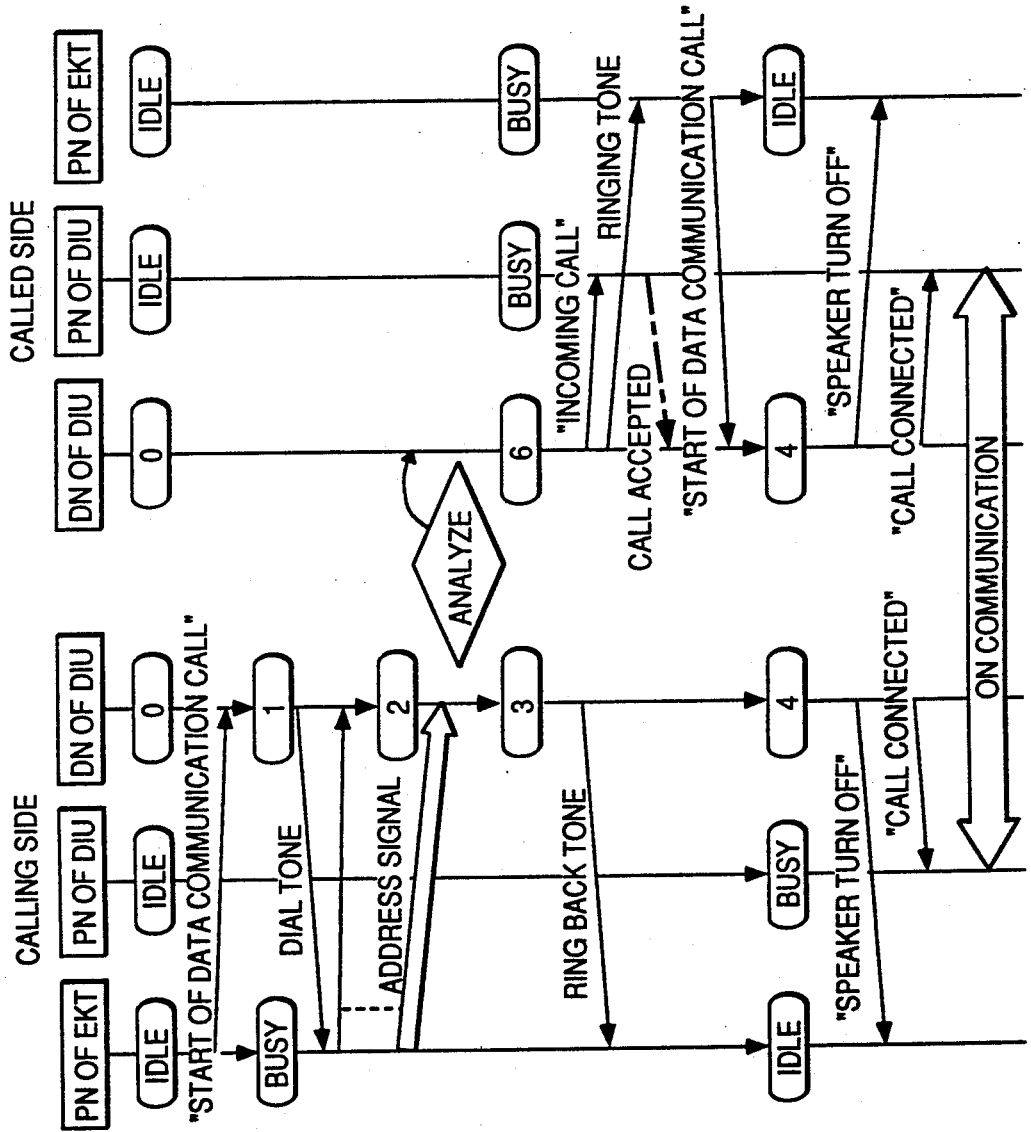
FIG. 2 illustrates one example of the progression of a call connection for a data communication call.

FIG. 2 is an illustration of one example of a call connection sequence. A calling DTE or DIU and its related EKT are illustrated on the left hand side in FIG. 2 and a called DTE or DIU and its related EKT is illustrated on the right hand side. This example represents the case in which a data communication call is originated when the calling DTE, the called DTE and the related EKTs are in the idle state. First, control data representing "start of data communication call" is transmitted from the EKT corresponding to the calling DIU. The exchange recognizes this control data and changes the PN state of the EKT corresponding to the calling DIU from "idle" to "busy" and the DN state of the calling DIU from "idle" to "sending dial tone to". To determine the DN of the calling DIU, the exchange refers to table 7 in FIG. 6 and table 1 in FIG. 6. At the same time, the exchange sends control data to cause a speaker within the EKT corresponding to the calling DIU to turn on and begins sending a dial tone signal to the EKT as a signal to the calling party that he may commence dialing. When the first digit of the telephone number, i.e. the first digit of the address signal, is received in the exchange, the exchange changes the DN state of the calling DIU from "sending dial tone to" to "receiving address signal from", and stops sending the dial tone signal. When all digits of the address signal are received, the exchange refers to the DN state of the called DIU and determines whether the called DIU is idle. Since it is idle in this case, the exchange changes the DN state of the calling DIU, the DN state of the called DIU, the PN state of the called DIU and the PN state of the EKT related to the called DIU to "called party ringing", "sending ringing tone to", "busy" and "busy", respectively. Then the exchange sends to the EKT related to the called DIU control data to cause a speaker in the EKT to turn on and a ringing tone signal for reproduction by the speaker, control data representing "incoming call" to the called DIU and a ring back tone signal to the EKT related to the calling DIU. There are two ways in which a response signal may be sent to the exchange, i.e., automatic and manual. An automatic response is sent by the DIU sending control data representing "call accepted". A manual response is sent by control data representing "start of data communication call" being transmitted from the EKT related to the called DIU. Regardless of the method used to respond, the exchange sends control data to cause the speakers of both EKTs to turn off and stops sending control data and other signals and sends instead control data representing "call connected" to both DIUs. At the same time, the exchange changes the PN state of both EKTs, the DN state of both DIUs and the PN state of the calling DIU to "idle", "connected" and "busy", respectively. Through this process of call connection based on the operation the EKTs, both DTEs are connected through both DIUs and the exchange. The foregoing description is only one example of how a call may be processed. Others will be described below.

Figure 3:
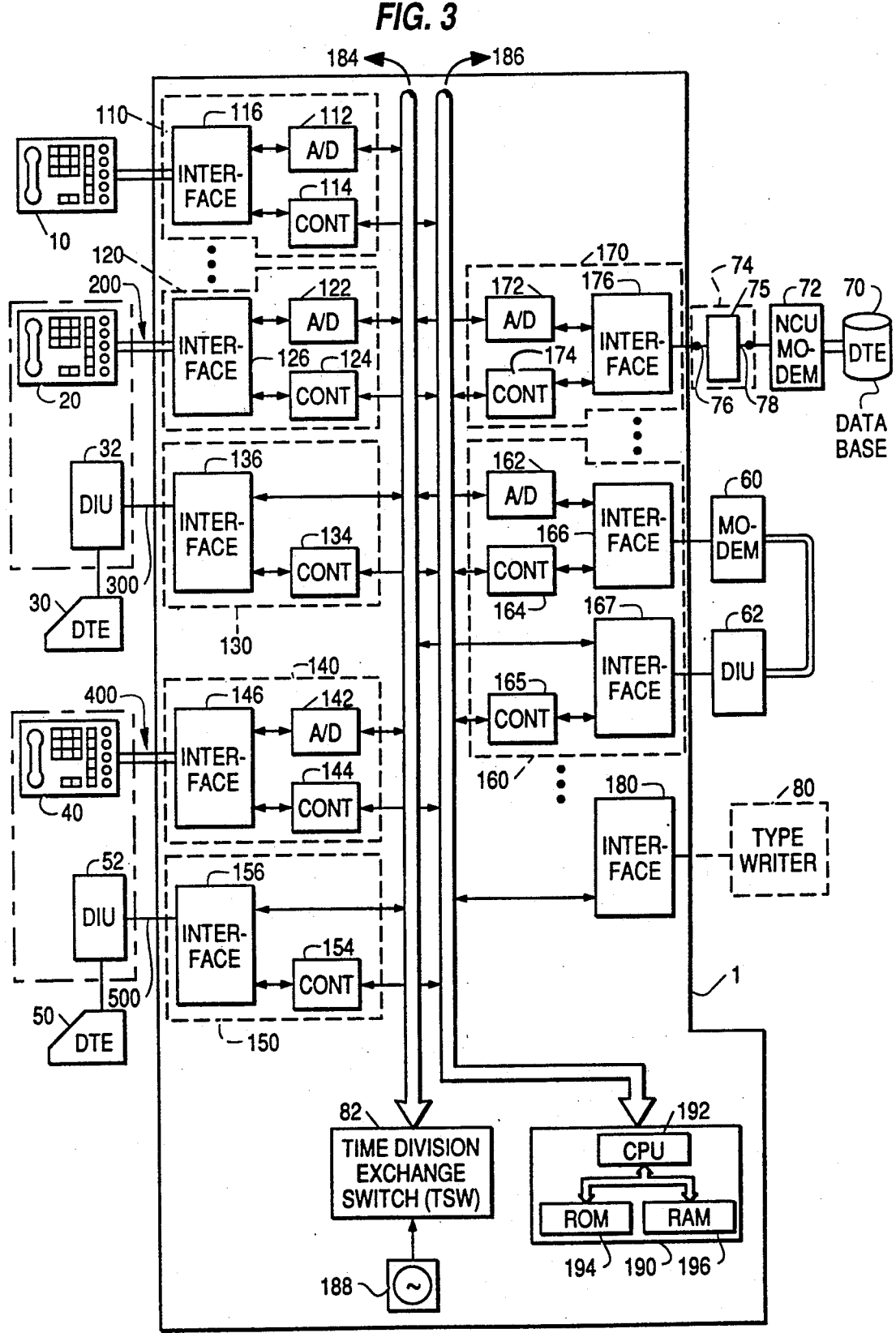
FIG. 3 is a more detailed block diagram of one embodiment of the present invention.

FIG. 3 is a block diagram of one embodiment of the present invention which includes exchange 1, EKTs (electronic key telephone sets) 10, 20 and 40 and other EKTs (not shown) connected to exchange 1, DTEs (data terminal equipment) 30 and 50 and other DTEs (not shown), DIUs (data interface unit) 32 and 52 and other DIUs (not shown) for connecting respective DTEs to exchange 1, and, pooled modem 60 and DIU 62 and other pairs of pooled modems and DIUs (not shown) for enabling data communication between the inner DTE, e.g., DTE 30, and the outer DTE 70. Outer DTE 70 may be connected to exchange 1 through NCU (network control unit) modem 72 and public communication line 74. A second exchange 75 may be connected between exchange 1 and NCU modem 72. Second exchange 75 may be included in public communication line 74. Typewriter 80 may also be connected to the exchange. Some EKTs, i.e., EKTs 20 and 40 are related to respective DTEs, i.e., DTEs 30 and 50. DIUs 32 and 52 for DTEs 30 and 50 are disposed close to respective EKTs 20 and 40 and in fact each respective EKT and DIU may be enclosed within the same enclosure as shown by the phantom lines in FIG. 3. The DIU may be secured in the space formed at the bottom of the EKT.

Exchange 1 includes line circuits 110 through 170, interface 180 for typewriter 80, time division exchange switch (TSW) 182, common speech buss 184, common data buss 186, tone signal source unit 188 and control unit 190.

Line circuits 110, 120 and 140, which are for respective EKTs, include converter 112, 122 and 142 which convert digital signals passing through TSW 182 to analog signals to be sent to the respective EKTs and vice versa, controllers 114, 124 and 144 which basically control transmission of control data from the respective EKTs to control unit 190 and vice versa, and interfaces 116, 126 and 146 each of which operate to transmit and receive analog signals, bi-directionally and in real time. The interface also operate to transmit and receive control data regarding telephone and data communication calls, the flow of signals being in ping-pong (bi-directional) fashion. Although in this embodiment, speech voice signals and various tones, e.g., a dial tone signal, a ringing tone signal and so forth, are transferred between the exchange and the EKT in analog form, they can also be converted and transmitted as digital signals as described in co-pending and commonly assigned application Ser. No. 834,415, filed Feb. 2, 1986. In such a case, an A/D converter is provided for the EKT.

Line circuits 130 and 150, which are for the respective DIUs, include controllers 134 and 154 which basically control the transmission of control data regarding data communication calls, and interfaces 136 and 156 which operate to transmit and receive control data and data transferred between the DTEs, bi-directionally and in the ping-pong transferring manner. This type of line circuit is similar to the one in the above mentioned co-pending application, although all eight bits of the voice signal region serve as data bits. Line circuit 160, which is for the pooled modem, function as a line circuit for the EKT and as a line circuit for the DIU. However, control data is not transferred between interface 166 and modem 60. Line circuit 170, which is connected to main wire 76 of public communication line 74, includes converter 172 which operates the same as converters 112, 122 and 142, controller 174 and interface 176. Interface 176 operates to transmit and receive analog signals bi-directionally and in real time. Thus, in this respect, it has the same function as interfaces 116, 126 and 146. However, interface 176 for main wire 76 is required to operate as a detector to detect a ringing signal from public communication line 74, to detect the state of call release (completion of call) of the public communication line and to send control data representing start (and completion) of a telephone (and communication) call to the exchange of public communication line 74, i.e., to make (to break) the direct current loop of main wire 76. These functions are all well known in the art as are the functions for the main wire interface. Controller 174 controls the transmission of control data conducted by interface 176 under the control of control unit 190 and transfers the result of the detecting operation of interface 176 to control unit 190.

TSW 182 operates to selectively switch its own speech (and data) paths in order to selectively connect the EKTs, the DIUs and tone signal source unit 188 through the line circuits, common buss 184 and its own speech path in any combination designated by control unit 190 in time division or multiplexed fashion. This function is also well known in the art.

Tone signal source unit 188 generates various signals necessary for indicating to the parties the state of progress of the call connection by way of sound, e.g., dial tone, ringing tone or the like, and also generates multi-frequency address signals to be sent to the public communication line in case of an outgoing call for public communication line 74.

Control unit 190 includes CPU (central processing unit) 192, ROM (read only memory) 194 and RAM (random access memory) 196 and controls the entire system by prosecuting several computer programs stored in ROM as described in more detail hereinafter.

Figure 4:
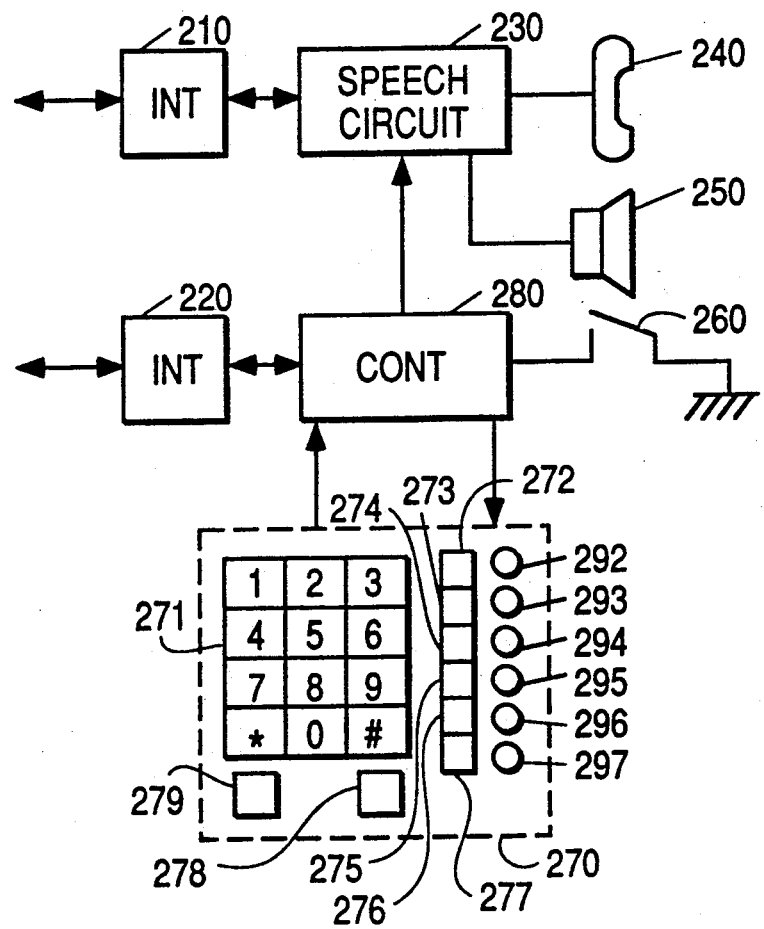
FIG. 4 is an illustration of the EKT shown in FIG. 3.

Each EKT, as shown more clearly in FIG. 4, includes interfaces 210 and 220, speech circuit 230, handset 240, speaker 250, hook switch 260, interface module 270 and controller 280. Interface 210 serves the same function that the line circuit interface for the EKT serves with respect to analog signals, i.e. interface 210 transmits and receives the analog signals bi-directionally and in real time. Speech circuit 230 transfers the received analog voice signals and the various tone signals to hand set 240 and speaker 250 and transfers voice signals from handset 240 to interface 210. Speech circuit 230 includes an amplifier through which amplified analog signals are applied to speaker 250. The amplifier is controlled to turn on as required by control unit 280.

Hook switch 260 is closed by a mechanical linkage (not shown) when hand set 240 is picked up.

Interface module 270 includes dial key 271, function keys 272 through 279, LEDs (light emitting devices) 292 through 297 and a driving circuit (not shown) for the LEDs. Various functions are assigned to the function keys, for example: a function which causes the transmission of control data representing "start of date communication call" is assigned to key 277 (called DIU key hereinafter); a function which causes the transmission of control data representing "finish of data communication call" is assigned to key 278 (called DRS key hereinafter); a function which causes the transmission of control data representing "start of the communication call" for a call using public communication line 74 is assigned to key 276 (called MOD key hereinafter); a function which operates to select an available DN from among three DNs, each of which is commonly alloted to this EKT and other EKTs, is assigned to three keys 272, 273 and 274 (called DN selection key hereinafter); and a function which causes control data representing "hold" is assigned to key 270. Another function may also be assigned to key 275.

The information/resulting from operation of the above described function keys is provided to controller 280. LEDs 292 through 294 and 297, which corresponds to selection keys 272 through 274 and DIU key 277, are provided for indicating the status of the progress of the call connection, e.g., the LEDs are continuously lit when the connection is made; flashing at a high rate during the calling or called status; and flashing at a low rate when on hold (in the status of having the other party called). LED 296 corresponding to DN key 276 is provided for indicating the condition of the modems by, e.g., being lit when all modems are occupied (busy or reserved), and being off when at least one of the modems is available. These LEDs are driven by respective driving circuits to which control signals are applied from controller 280.

Controller 280 forms the control data when hook switch 260 and keys 272 through 279 are operated, and sends the data to interface 220. Controller 280 also applies control signals to the amplifier of speech circuit 230 to cause it to turn on or off and to the driving circuit of interface module 270 to cause the LEDs to light, flash or turn off, when respective control data is transmitted from the exchange through interface 220.

Figure 5:
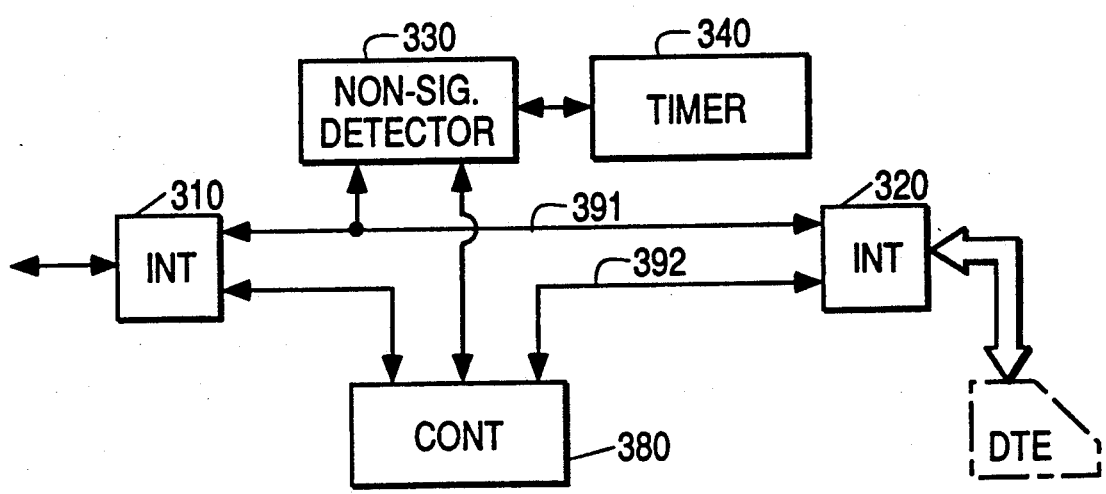
FIG. 5 is an illustration of the DIU shown in FIG. 3.

Each DIU, as is best shown in FIG. 5, includes interface 310 and 320, non-signal detecting circuit 330, timer 340 and controller 380. Interface 310 serves the same function as the interface for the line circuit for the DIU, i.e., interface 310 functions to transmit and receive control data and data transferred between DTEs, bi-directionally and in the ping-pong transferring manner. The received and separated control data and net data are provided to controller 380 and to the DTE (or the modem) through interface 320, respectively. Control data from controller 380 and data from the DTE are combined (multiplexed) to be transmitted by interface 310. Transmission and reception are alternately repeated. Thus, this method is called the ping-pong transferring method. Interface 320 has a function similar to that of interface 136. Thus, it transmits and receives net data between one DTE and another DTE and control data between controller 380 and a DTE. However, the transferring method depends on the kind of DTE or modem. The requirements with respect to the interface have been standardized for public use.

Non-signal detecting circuit 330 is used to determine whether a non-signal condition on data line 391 exists for a predetermined period, for example 20 minutes, as set by timer 340. A non-signal condition (a continuous logical "high" for example) over the predetermined period occurs in the case where the party (user) has not operated DRS (data ready signal) key 278 during the predetermined period and the DTE is of the type which does not transmit control data representing "clear request" automatically when the call is complete. In such a case, the communication paths has to be prevented from being occupied or tied up for wasted periods of time. Therefore, the detection results is provided to controller 380 so that the control data representing "non-signal continued" is sent. Other control data from the DTE is also provided to the controller via control line (392).

Controller 380 forms control data representing "non-signal continued" upon receipt of the detection result, and sends it along with any other control data to interface 310.

It is noted here that keys corresponding to the DIU key, the DRS key and the dial key are removed from the DIU. Therefore, the DIU is markedly reduced in bulk, resulting in it being able to be disposed in empty space within the EKT.

The operation of the entire system is controlled by control unit 190 which executes computer programs illustrated by the flow charts shown in FIGS. 7 through 19, with reference to the several tables shown in FIG. 6.

As discussed above, FIG. 6 shows eight tables used in this embodiment of the present invention. Some tables are the same as mentioned before, other are additional tables. These tables are stored in RAM 196 within control unit 190 namely, at the addresses of RAM 196 which are shown at the left hand side of FIG. 6. The contents of each table, shown at the right hand side, are stored in respective address locations.

In the PN-DN table (table 1), the corresponding information between all PN and respective DN or DNs are stored. Each DIU usually has one DN. Most EKTs have several DNs each of which the other EKTs commonly have, in a private branch exchange.

The kind of terminal, e.g., rotary dial telephone set, EKT, DIU, main wire, pooled modem and so forth and key assignment information are also stored in this table. Table 1 is mainly used for determining the DN of a terminal which transmits certain control data and what kind of terminal it is.

Table 2 is a DN-PN table which has the same relation as table 1 with respect to DN-PN but in the opposite direction. It is possible to determine quickly the PN for a particular terminal by referring to this table 2. Several PNs also have priority over the PNs. When a call occurs for a certain DN, the exchange sends a ringing tone signal to the EKT having the first ordered priority and also sends control data to flash the LED associated with such EKT. The exchange also sends a control signal to the other EKT or EKTs having the lower ordered priority. Accordingly, it is possible to respond to the call at the appropriate EKT. In the case where the first ordered EKT is in the busy state when the call occurs, the next ordered one is treated as the first ordered one instead.

Table 3 is a PN state table. A PN state, i.e. idle or busy, is stored with respect to every PN. Table 3 is one of the tables to which the exchange refers for the proper output of control data with respect to the LEDs for the EKTs. The exchange first refers to table 3. During most times, the EKT will be in the idle state. If so, the exchange no longer needs to refer to the other tables and is able to process the next EKT (PN). According to this processing sequence, it is possible to reduce the total time required to process output control signals because the time required to refer to this table is shorter than the others, owing to simplicity of its content. Table 3 is also used for determining quickly which state the called EKT is in.

Table 4 is a DN state table. The above mentioned DN state number is stored with respect to every DN. Table 4 is used by the exchange to process a call connection as described above. Table 4 is also used by the exchange along with the other tables for output processing.

Table 5 is a PN-using DN table. The DN which each terminal (PN) is then using for the call is stored in table 5. Table 5 is used for determining which DN was being used by the terminal from which control data representing "finish of telephone call", "finish of data communication call" or the like is received. Then the exchange changes the state of the DN to "idle" and then performs the required output process.

Table 6 is a table for the other party's DN. The DN which the other party is then using for the call is stored in this table at the address corresponding to the "start address of table" increased by the number of the DN being used by the party. Table 6 is used for determining which DN was being used by the other party (terminal) when control data representing "finish of the telephone call" or the like is received from the terminal of such party. After that determination is made, the exchange changes the state of the other party's DN to "idle" without waiting for the reception of the same control data. Thus, tables 5 and 6 are basically used at the same time.

Table 7 is a PN of EKT table and table 8 is a PN of DIU table. In table 7, PNs of DIUs are in a memory location established by the "start address of table 7" plus the numbers representing the PNs of the EKTs related to the DIUs, respectively. In other words, table 7 stores correspondence information regarding the EKTs and DIUs. Therefore, when the exchange has to determine the PN of the DIU upon receipt of control data from the related EKT, the exchange is able to do so by referring to table 7. In table 8, the table contents are opposite to the contents in table 7. It is not necessary to provide both table 7 and 8, since the information in one is substantially the same as that in the other. However, providing both tables makes it possible for the exchange to obtain the information it needs in a very short time.

There are several ways in which the DIUs may be interconnected in this embodiment of the present invention. One such way is to have the calling DIU connected to the desired called DIU by depressing DIU key 277 and dial key 271 at the EKT related to the calling DIU without the user actually talking on the telephone. Another way to have the calling DIU connected to the called DIU is by depressing DIU key 277 at either the calling EKT or the called EKT which was being used for talking on the phone before the keys were depressed. A further way is to have one DIU connected to the main wires of public communication line 74 through one of the pooled modems by depressing the DIU key at the EKT related to the DIU after the interconnection between the EKT and the main wires is completed.

When the user of the EKT, e.g. EKT 20, wants to have related DIU 32 connected to the desired DIU (e.g., DIU 52), for data communication without talking on the telephone, the user depresses DIU key 277 of EKT 20. Then, controller 280 forms control data representing "start of communication call" and controls interface 220 to transmit it to line circuit 120. Controller 124 of line circuit 120 transfers the control data to control unit 190. CPU 192 of control unit 190 executes computer programs represented by the flow charts in FIGS. 7 through 16 for control of call connection, i.e., the call establishment, call release and the associated input and output process in an alternative call connection process of this embodiment of the invention. CPU 192 regularly examines whether any control data is received and what the received data represents, at steps 701 and 702. When the received data is found to be "start of data communication call", CPU 192 then executes the process of step 703 which includes the many sub-steps shown in FIG. 8. CPU 192 determines whether the EKT which transmitted the control data has a DIU by referring to table 7 and whether the DIU is idle by referring to table 3 (steps 801 and 802). If the EKT does not have a DIU, or when the DIU is not idle, CPU 192 ends the process and starts again from the beginning. Since EKT 20 has DIU 32, and DIU 32 is idle, in step 803, CPU 192 changes the PN state of EKT 20 and the DN state of DIU 32 to "busy" and "sending dial tone to", respectively and performs the required output process, i.e., transmits control data to cause speaker 250 of EKT 20 to turn on, transmits control data to light LED 297 of EKT 20 and controls TSW 182 and tone signal source unit 188 to send a dial tone signal to EKT 20. At the same time CPU 192 stores the DN of the DIU as the using DN in table 5. Storing this using DN with respect to DIU is superficial here because the DIU has only one DN in this embodiment. However, such storing is necessary for uniform processing. At the EKT, LED 297 is turned on and speaker 250 re-produces a dial tone. The user then depresses dial key 271 in the order of the DN of the desired DIU, e.g., dials a telephone number. When dial key 271 is depressed, controller 280 of EKT 20 transmits control data representing an address signal (the telephone or directory number). Upon receipt of the first digit of the address signal (the first digits of the DN), CPU 192 changes the DN state of the DIU to "receiving address signal from" and stops sending the dial tone signal. Also, in step 803, CPU 192 receives the rest of the digits of the address signal.

Figure 9:
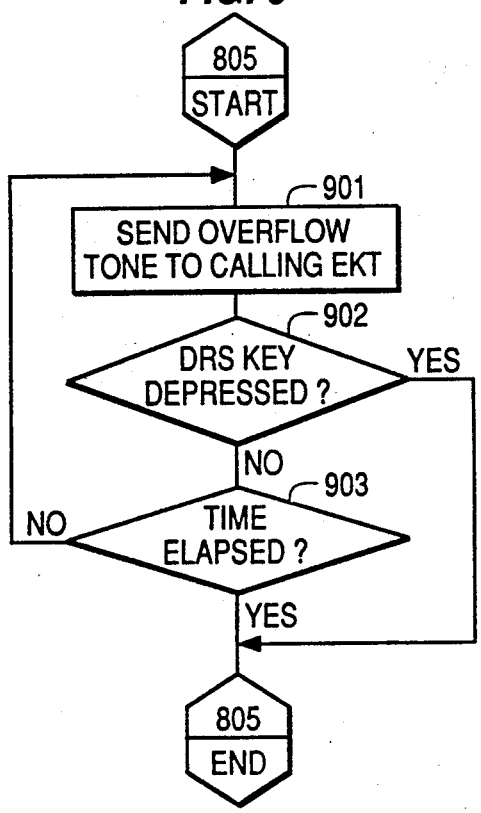
FIG. 9 shows in more detail step 805 of the flow chart shown in FIG. 8.
Figure 10:
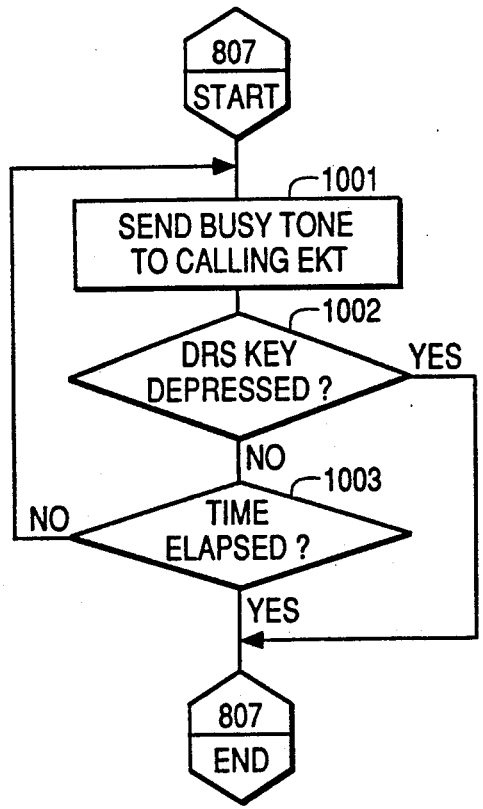
FIG. 10 shows in more detail step 807 of the flow chart shown in FIG. 8.

When the required number of digits of the address signal are received, CPU 192 determines whether the terminal having this DN is a DIU, referring to table 2 and table 1 (step 804). If the terminal is not a DIU, CPU 192 executes the process of step 805 which includes steps 901 through 903 shown in FIG. 9. With reference to FIG. 9, CPU 192 changes the DN state of DIU 32 to "sending overflow tone to", and controls the sending process in a similar manner to that of dial tone signal (step 901). CPU 192 continues sending until the user of EKT 20 depresses DRS key 278 or until a predetermined period elapses (steps 902, 903 and 901). CPU 192 then returns to END from step 805 in FIG. 8. Since the terminal is a DIU, i.e., DIU 52, CPU 192 then refers to table 4 to determine whether the DIU is idle (step 806). If DIU 52 is not idle at this time, CPU 192 executes the process of step 807 which includes steps 1001 through 1003 shown in FIG. 10 to send a busy tone signal to EKT 20 in a manner similar to sending an overflow tone signal then ends the process and begins again. Since DIU 52 is in the idle state, CPU 192 changes the DN state of the calling DIU 32 and the called DIU 52 to states 3 and 6, respectively, and executes the required output process (step 808). Although the DN state of DIUs 32 and 52 are changed, the required tone signal and so forth are sent to the EKT. Note that the DN state of EKTs 20 and 40 are not changed. Thus, control data to cause LEDs 297 of EKT 20 and 40 to flash are sent. The ringing tone signal and the ring back tone signal are sent to EKT 40 related to called DIU 52 and EKT 20 related to calling DIU 52, respectively. Control data to cause speaker 250 of EKT 40 to turn on is also sent. At the same time, CPU 192 changes the PN state of called DIU from "idle" to "busy", and also sends control data representing "incoming call" to DIU 52, (step 809). CPU 192 then stores the DN of called DIU 52 and the DN of calling DIU 32 as the other party's DNs in table 6, respectively, for the restoration process caused by depression of DRS key 278 of either EKT thereafter and for the connection process caused by depression of DIU key 277 of the EKT related to called DIU 52. If DIU 52 is set in the automatic response mode, it would respond to this control data.

Figure 7:
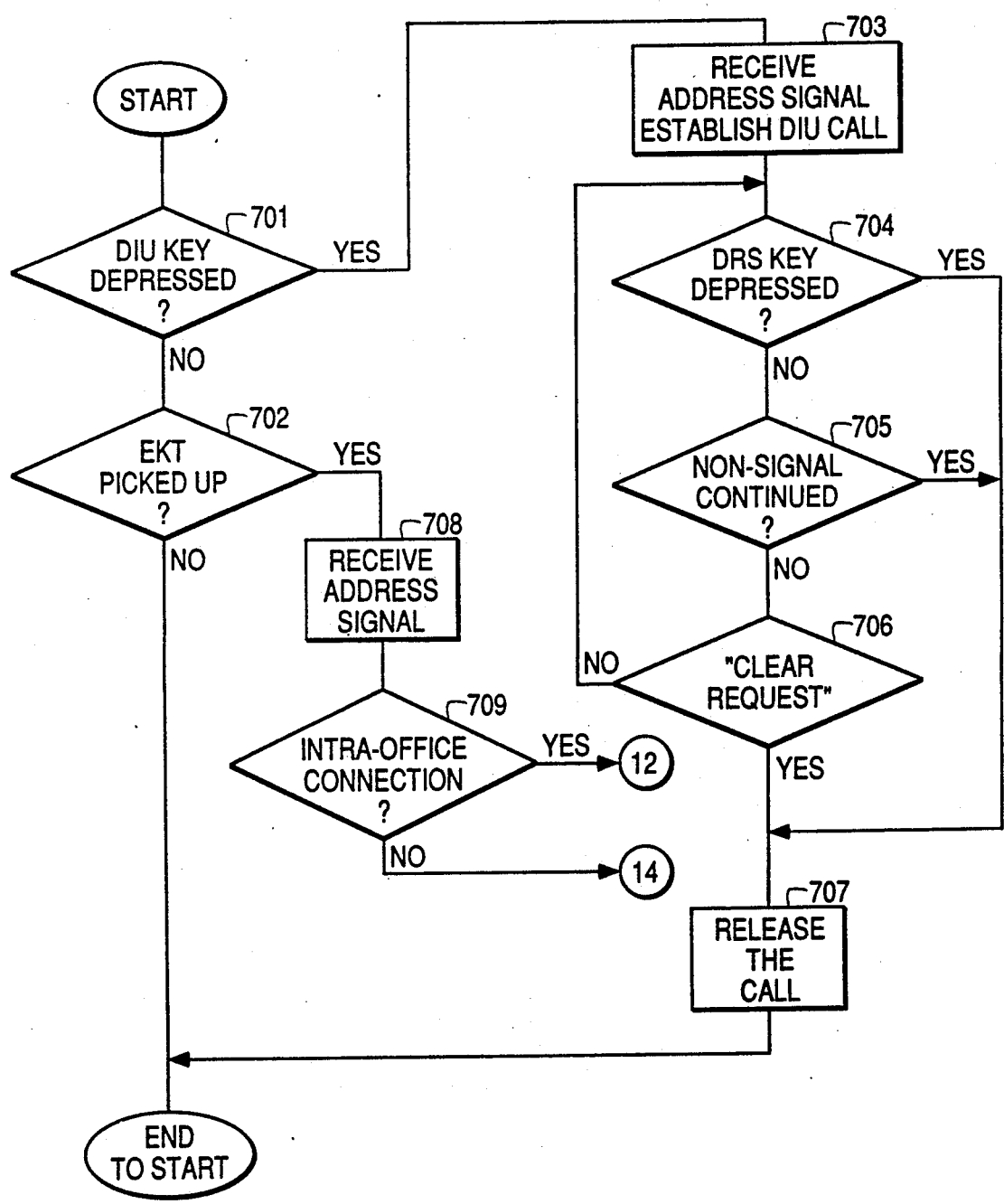
FIG. 7 is a flow chart of a computer program executed by CPU 192 shown in FIG. 3.
Figure 8:
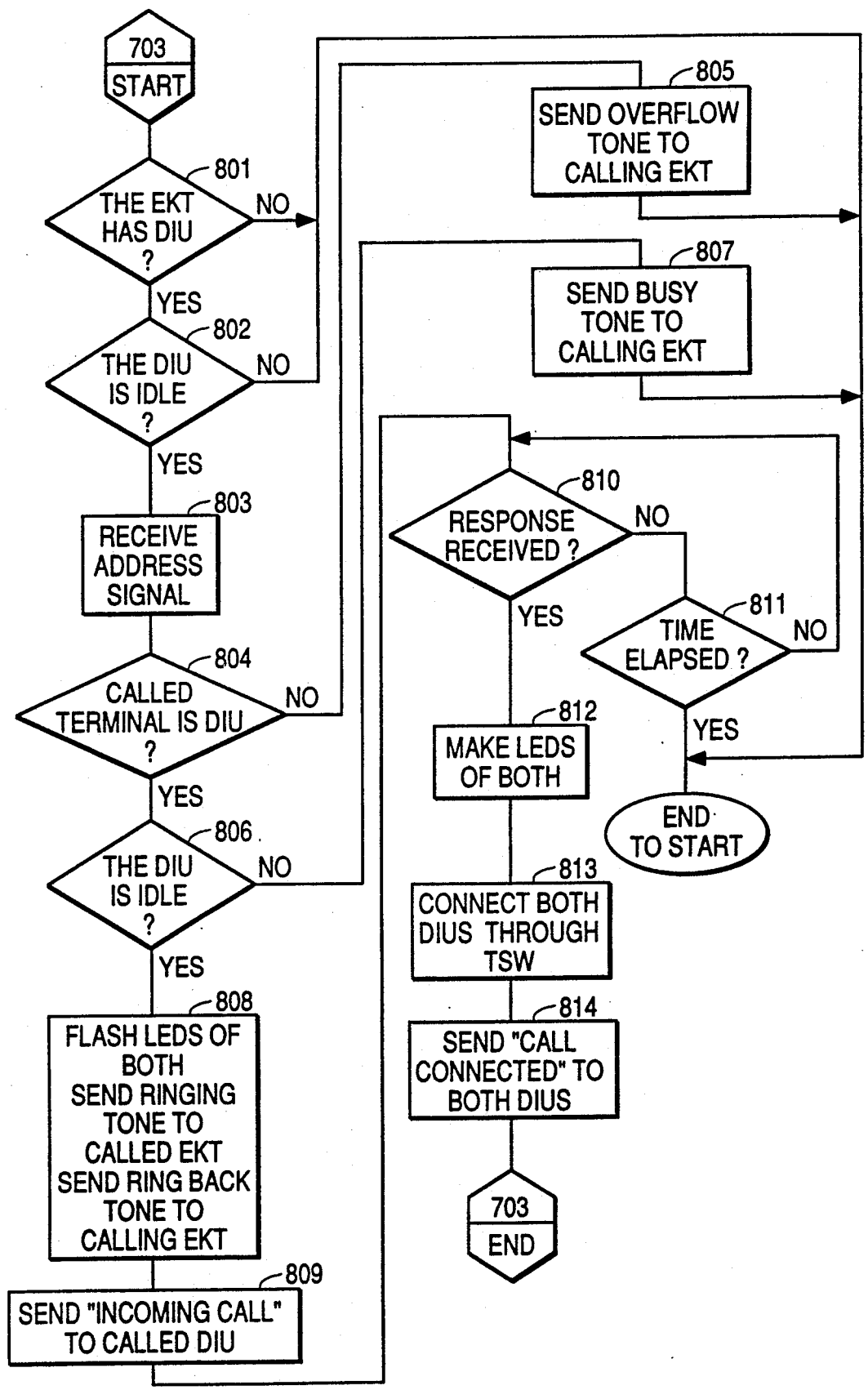
FIG. 8 shows in more detail step 703 of the flow chart shown in FIG. 7.

If not so set, CPU 192 waits for control data representing "start of data communication call" coming from EKT 40 related to the called DIU 52 as the response unless a predetermined time elapses, (step 810 and 811). Where the time has elapsed CPU 192 ends the process. When the control data regarding the response is received, after confirming both DIUs to be connected by referring to tables 7, 1, 6 and 5, CPU 192 changes the PN state of both EKTs from "busy" to "idle", changes the PN state of calling DIU 32 from "idle" to "busy", changes the DN state of both DIU's 32 and 52 to "connected" and then performs the required output process of steps 812 through 814 and associated output processes almost simultaneously. Namely, CPU 192 sends control data to cause both speakers 250 of EKTs 20 and 40 to turn off. CPU 192 also stops sending the ringing tone signal, ring back tone signal, the control data for flashing the LEDs and the control data representing "incoming call". CPU 192 sends instead control data which causes LEDs 297 of both EKTs to continuously light (step 812). CPU 192 then stores the using DN for the called DIU 52 in table 5. CPU 192 further controls TSW 182 to connect both line circuits 130 and 150 in order to connect DTEs 30 and 50 through DIUs 32 and 52 (step 813), and sends control data representing "call connected" to both DIUs 32 and 52 (step 814). Thus, the process of step 703 shown in FIG. 7 is completed. Then controllers 380 of DIUs 32 and 52 controls respective DTEs 30 and 50 to actually start the data communication.

After establishment of the call connection, CPU 192 maintains the connection unless it receives a control data representing 37 finish of data communication" from either EKT 20 or 40, control data representing "non-signal continued" from either DIU 32 or 52, or a control data representing "clear request" from either DIU 32 or 52 (step 704, 705, and 706). In such a situation the users of both EKTs 20 and 40 are able to use the respective EKTs for ordinary telephone calls because the state of both EKTs is idle. When any call among them comes, CPU 192 executes the process of step 707 which includes the sub-steps shown in FIG. 11 for control of call release by referring to tables 5 through 8 to determine the DIUs to be disconnected and the related EKTs.

Figure 11:
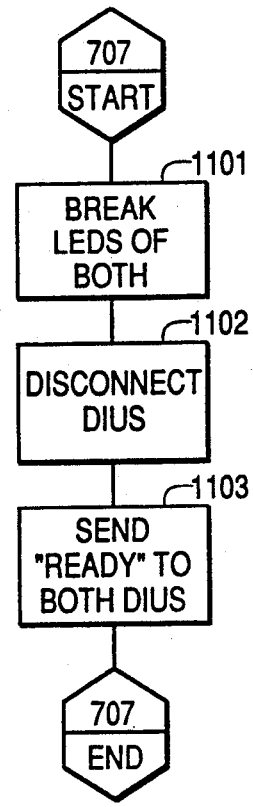
FIG. 11 shows in more detail step 707 of the flow chart shown in FIG. 7.
Figure 16:
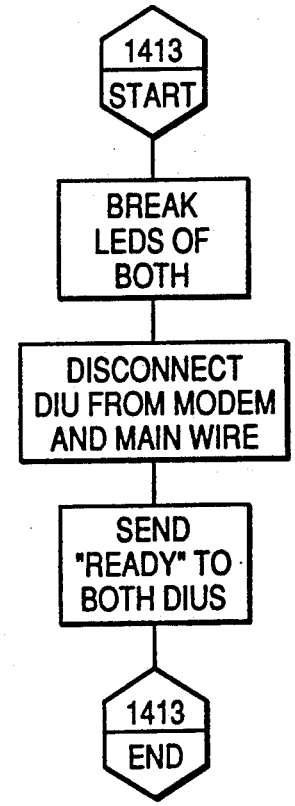
FIG. 16 shows in more detail step 1413 of the flow chart shown in FIG. 14.

With reference to FIG. 11, the CPU sends control data to cause LEDs 297 to turn off (step 1101), controls TSW 182 to disconnect the connection (step 1102), and sends control data representing "ready for next communication" to DIUs 32 and 52. At the same time, CPU changes all the PN states of both DIUs and the DN state of both DIUs to "idle". Thus, data communication call is completed.

A second way to have the DIU connected to the other party's DIU through the intra-office connection of both EKTs will now be described. In this case, the connection between the EKTs, e.g., the connection between EKTs 20 and 40 is established before connection of the DIUs. The user of EKT 20 first picks up the handset 240 so that hook switch 260 closes and then depresses one of the DN selection keys. Then, controller 280 of EKT 20 generates control data representing "start of telephone call" and "selected DN" and controls interface 220 to send them successively to line circuit 120. This control data representing "start of telephone call" might be generated in response to depression of a function key, e.g., key 275 instead of picking-up operation. Controller 124 transfers the received control data to control unit 190. CPU 192 determines the reception of the control data along with the PN through which the control data is received (step 702). Thereafter, CPU 192 changes the PN state and DN state of EKT 20 to "busy" and "sending dial tone to", respectively, and processes the required output process similar to that in step 803 in FIG. 8, even though no control data is sent to the DIU (step 708). CPU 192 then stores the using DN in the address corresponding to the PN of EKT 20 in table 5. Thereafter, CPU 192 receives the first and remaining digits of the address signal. Upon reception of the first digit, CPU 192 changes the DN state of EKT 20 and performs the required output process in the same manner as described before. CPU 192 determines whether the call is for the intra-office connection, i.e. the connection between the terminals within its own switching system, from the first digit of the address signal (step 709).

Figure 12:
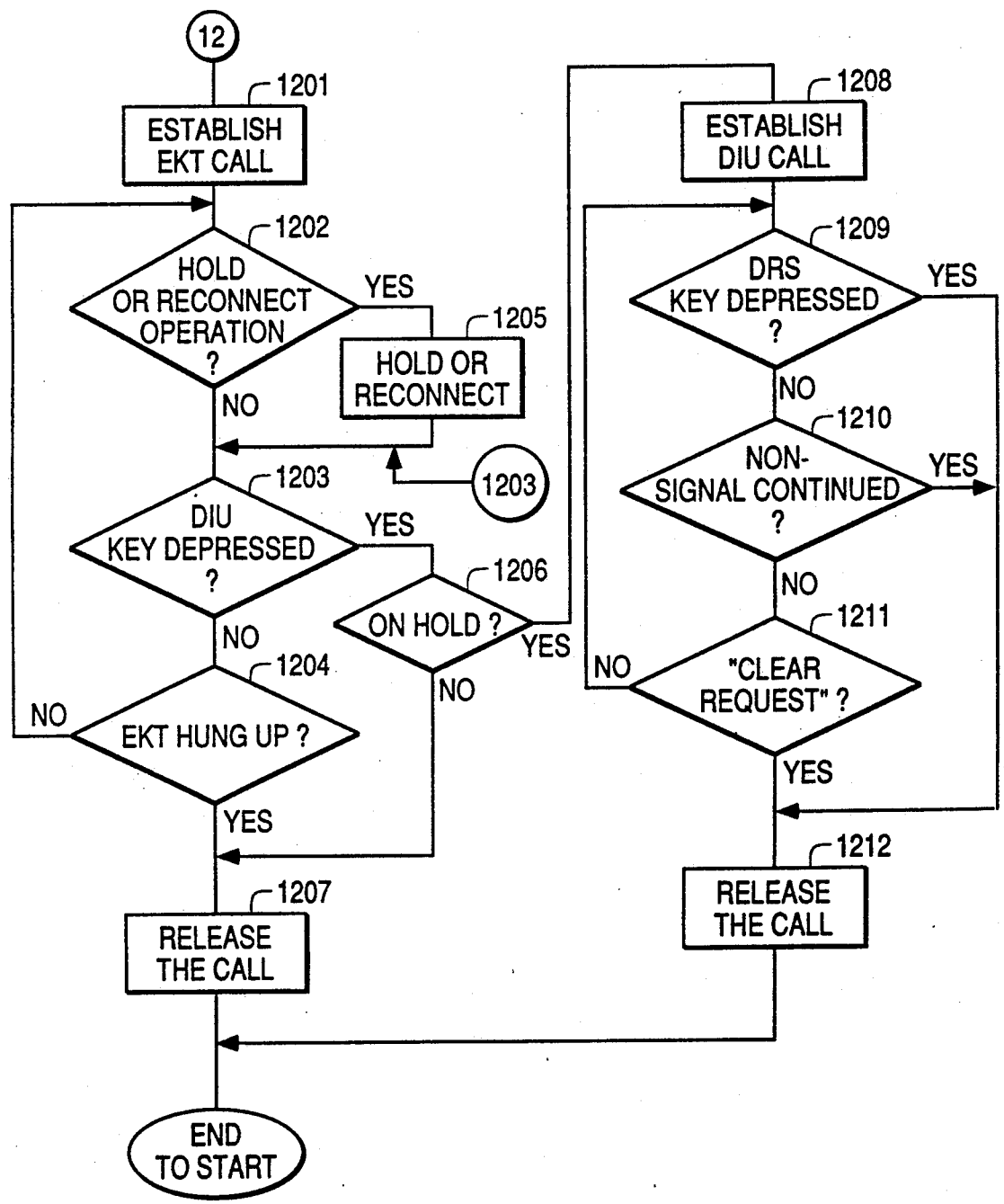
FIG. 12 is an extension of the flow chart following step 709 shown in FIG. 7.
Figure 13:
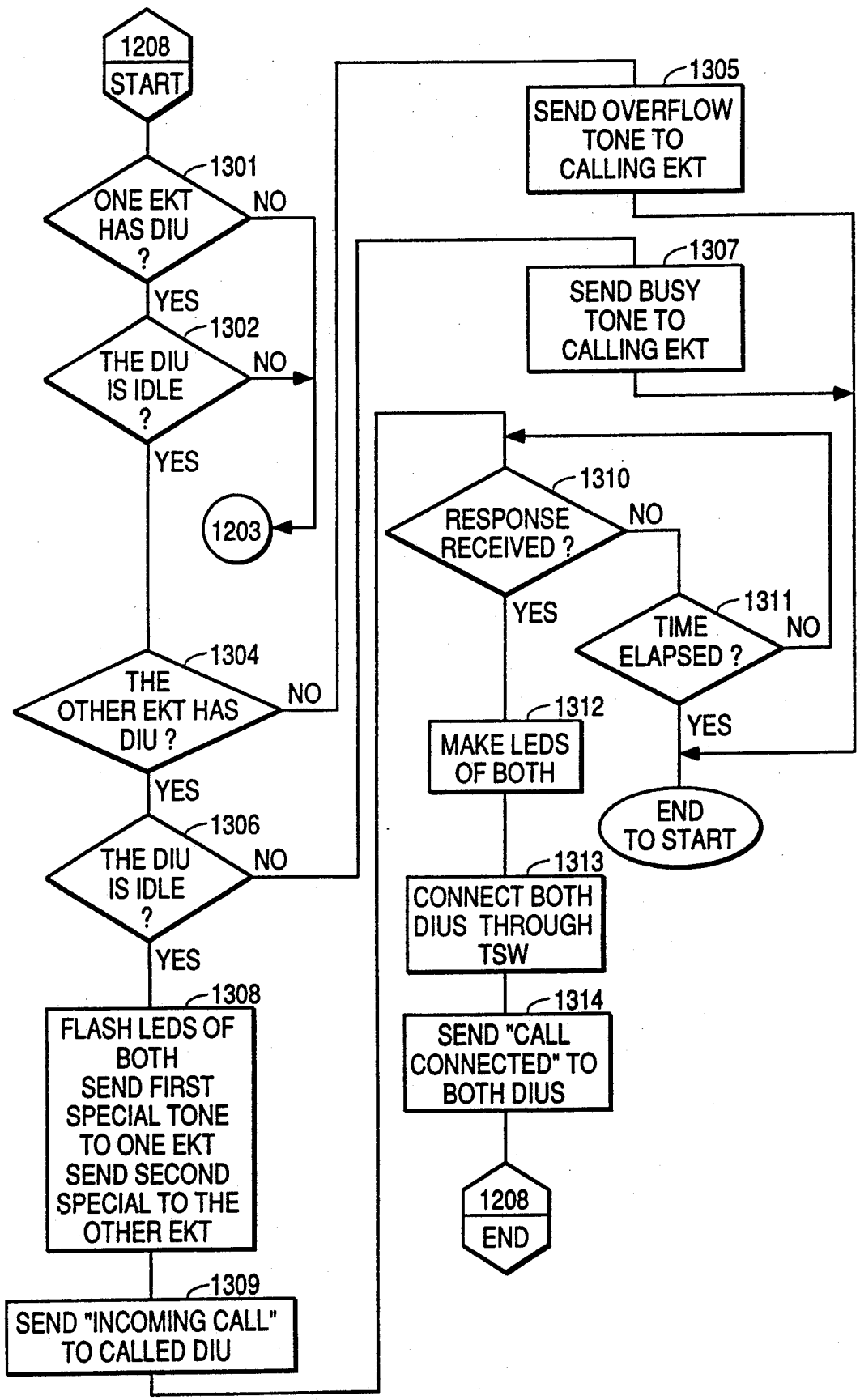
FIG. 13 shows in more detail step 1208 of the flow chart shown in FIG. 12.

Since it is for the intra-office connection in this case, CPU 192 executes the following steps shown in FIG. 12. With reference to FIG. 12, CPU 192 establishes the call connection between calling EKT 20 and called EKT 40 through the customary progression process of the call connection. The required changing of the PN state and the DN state, the required writing of the using DN and the other party's DN and the required output process are performed. Then both parties can talk to each other using respective EKT 20 and 40.

After the establishment of the call connection, CPU 192 maintains the connection unless it receives control data representing "hold" from either EKT 20 or 40, control data representing "start of data communication call" resulting from the depression of DIU key 277 from either EKT 20 or 40, or control data representing "finish of telephone call" from either EKT 20 or 40 (steps 1202 through 1204). When CPU 192 receives the "hold", it changes the DN state of the EKT from which the "hold" is transmitted and the DN state of the other EKT to "on hold as holding side" and "on hold as held side", respectively. In this hold status, the connection between the holding EKT and the held EKT is disconnected. Control data which causes corresponding LEDs to flash are sent to all the EKTs which have the same DN that the holding EKT has used and to all the EKTs which have same DN that the held EKT has used. Also, the hold tone or the like is sent to the held EKT. Thereafter the user of the holding EKT, or whichever of the EKTs which have the same DN as the holding EKT, can talk with the user of the held EKT by depressing the DN key corresponding to the holding DN in addition to picking-up the handset (steps 1202 and 1205).

If CPU 192 receives "start of data communication call" (step 1203), it determines whether the EKT call connection is held (step 1206). In this embodiment, the data communication call through an intra-office connection is permitted when the DIU key is depressed during the hold because it is easy to control the transmission of the various tones for the next DIU call connection. However, it is possible to transmit the tone signals by using the technique of conference speech path connection. If the DIU key is depressed during the talking state, CPU 192 executes the process of step 1207 to release the call. CPU 192 then executes the process of step 1208 which includes the sub-steps shown in FIG. 13. As can be understood by comparing FIG. 13 with FIG. 8, the process to be executed here is almost the same as that of FIG. 8. CPU 192 refers to tables 7 and 3. When the EKT (holding EKT or held EKT) at which DIU key 277 is depressed does not have a DIU or the DIU to become the calling DIU is not idle, CPU 192 returns to step 1203 nullifying the depression of the DIU key (step 1301 or 1302). Assuming that the calling DIU is idle, CPU 192 next determines whether the other EKT (held EKT or holding EKT) has a DIU and whether the DIU to become the called DIU is idle, referring to the tables 6, 2, 7 and 3 (steps 1304 and 1306). If the other EKT does not have a DIU, or the called DIU is not idle, CPU 192 then executes step 1305 or 1307 in the same manner as step 805 or 807 described before, respectively.

Assuming that the called DIU is idle, CPU 192 changes the PN state of the called DIU from "idle" to "busy", changes the DN state of the calling DIU and the called DIU to "sending ring back tone to" and "sending ringing tone to", respectively. However, the PN state of both EKTs remains in the "busy" state and the DN state of the holding EKT and the held EKT remain in the "on hold as holding side" state and on "hold as held side", respectively. Therefore CPU 192 continues the output process required for the DN state of both EKTs, and re-starts the output process required for the DN state of both DIUs to the corresponding EKTs. CPU 192 continues sending a control signal to cause LEDs corresponding to the hold and held DN to flash at a low rate to the holding side of EKTs and the held side of the EKTs as well as sending a hold tone signal or the like to the held EKT. CPU 192 newly starts sending a control signal to cause the LEDs 297 corresponding to the DIU keys of both EKTs related to the calling and called DIUs to flash at a high rate to both EKTs and sending a first special tone signal and a second special tone signal to the EKT (the one EKT) related to the calling DIU and to the EKT (the other EKT) related to the called DIU, respectively, based on the DN state of the DIUs (step 1308). The first special tone and the second special tone are the replacement of the ring back tone and the ringing tone respectively. The first special tone signal is a short duration signal having a comparatively high frequency. The second special tone signal is a continuous tone signal also having a comparatively high frequency. CPU 192 also sends control data representing "incoming call" to the called DIU so that the DIU can automatically respond if it has the function (step 1309).

Thereafter, CPU 192 executes steps 1310 through 1314 similar to steps 810 through 814. When CPU 192 receives the response, i.e., control data representing "start of data communication call" or control data representing "call accepted" from the other EKT or the corresponding called DIU, CPU 192 changes the PN state of the calling DIU to "busy" and changes the DN state of the both DIUs to "connected". At this time, the PN state of the called DIU remains "busy" as it has been. Then, the above newly started sending of control signals and tone signals stops in accordance with this change of state. Instead, CPU 192 sends a control signal to both EKTs (step 1312) to cause both LEDs to light continuously. CPU 192 then controls TSW 182 to connect both DIUs (step 1313). CPU 192 further sends a control signal representing "call connected" to both DIUs (step 1314). In this way the data communication actually starts. At this time, the EKTs are still in the "on hold" state uninterruptedly. The process for these EKTs being on hold is set forth in steps 1202 through 1207. Therefore, the user of the holding EKT has only to perform the operation of hold release so that both users can talk again. Thus, in this embodiment, it is necessary to perform the operation for hold release. However, this might be changed to eliminate the necessity to perform the operation for hold release, i.e., it is possible to change their DN state to "connected" automatically, thereby the users can talk after the connection of DIUs and the connection of EKTs without any operation.

The process regarding both DIUs is shown in steps 1209 through 1211. When CPU 192 receives control data representing "finish of data communication call" resulting from the depression of DRS key 278 from either EKT 20 or 40, control data representing "non-signal continued" from either DIU 32 or 52, or control data representing "clear request from either DIU 32 or 52, CPU 192, changes all the PN states and the DN state regarding the DIU and performs the required output process at step 1212 the same as step 707. At this time the LEDs corresponding to the DIU keys are turned off without regard to the state of the EKTs.

Thus, it is possible to have related DIUs connected while the EKTs may still be used for talking without complete disconnection of the speech paths between the EKTs in this embodiment. Therefore, it is never necessary to perform the operation for further selecting the other party's DIU, i.e., for dialing again, and the user only has to perform an easy operation to begin talking again.

Figure 14:
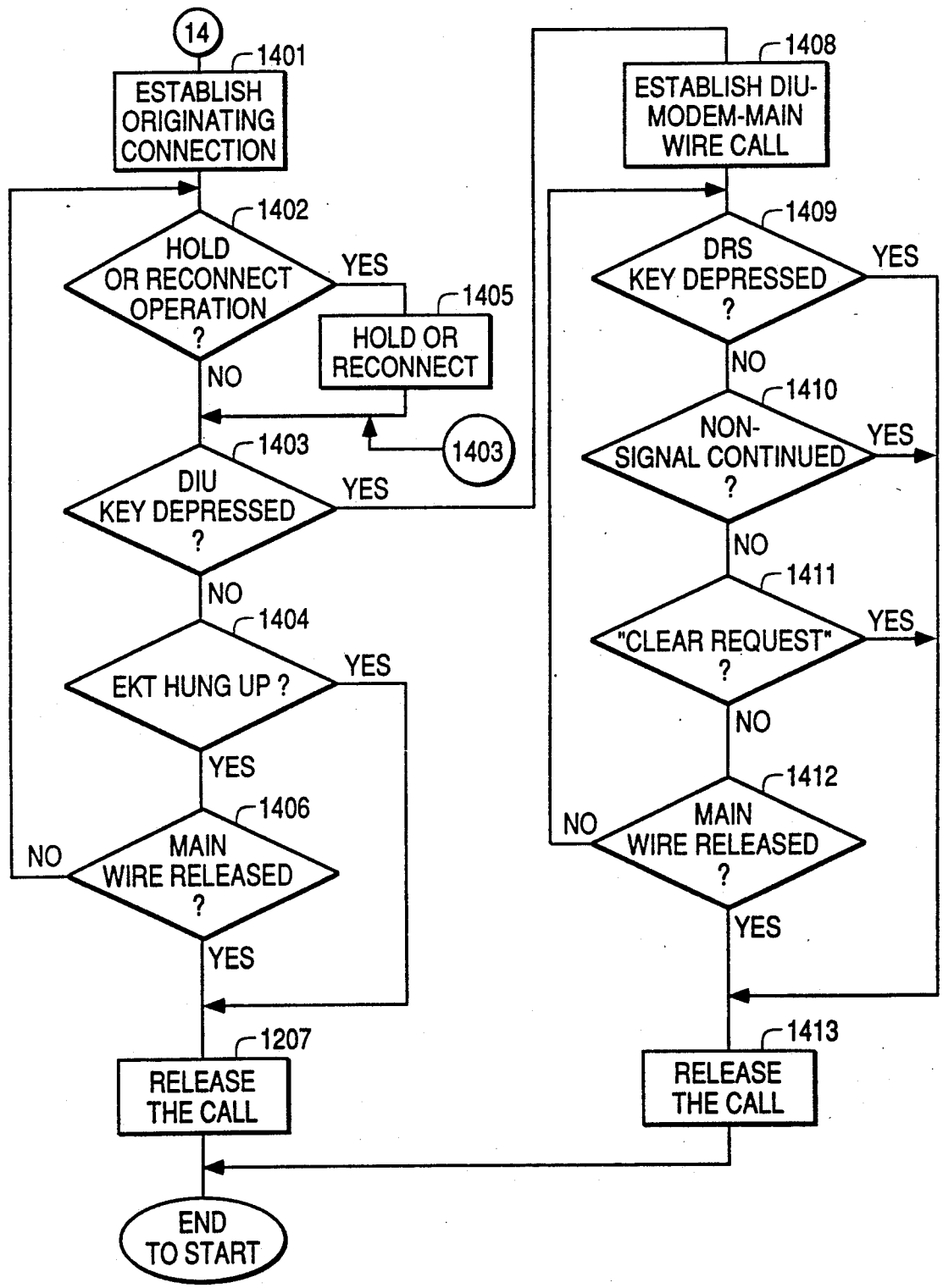
FIG. 14 is an extension of the flow chart following step 709 shown in FIG. 7.

A further way to have one DIU connected to the main wires of the public communication line through one of the pooled modems by depressing the DIU key at the EKT related with the DIU after the interconnection between the EKT and the main wire will now be described. In this case, the use of the EKT, e.g. EKT 20, picks up the handset 240, depresses one of DN selection keys 272 through 274 and performs the dial operation by depressing dial key 271 in the order of a special number representing an out-going call, e.g., "0", and directory numbers of the other subscriber of the other switching system. The process according to steps 702, 708 and 708 are executed in the same manner as that in the case of an intra-connection as described above. When CPU 192 determines that the call is an outgoing one from the additional number "0", CPU 192 executes the process of steps shown in FIG. 14. With reference to FIG. 14, CPU 192 establishes as originating connection between EKT 20 and one of the available (idle) main wires, e.g., main wire 76, through the required and customary process including sending of the address signal. If the other party responds to the call, EKT 20 and the terminal of the other party are connected through exchange 1, main wire 76, other switching system 74 and main wire (78) for the terminal of the other party (step 1401). At this time, the required changing of the DN state and the PN state, the required writing of the using DN and the other party's DN (the DN of the main wire) and the required output process is performed.

After the establishment of the originating connection, CPU 192 maintains the connection unless it receives control data representing "hold" from EKT 20, control data representing "start of data communication call" from EKT 20, control data representing "finish of telephone call" from EKT 20 or control data representing "main wire released" from line circuit 170 (steps 1402 through 1407). When CPU 192 receives "hold" from EKT 20, it changes the DN state of EKT 20 and the DN state of line circuit 170 (main wire) to "on hold as holding side" and to "on hold as held side", and processes the required output process.

If CPU 192 receives "finish of telephone call" or "main wire released", it processes the step 1407 basically the same as step 1207 in FIG. 12.

Figure 15:
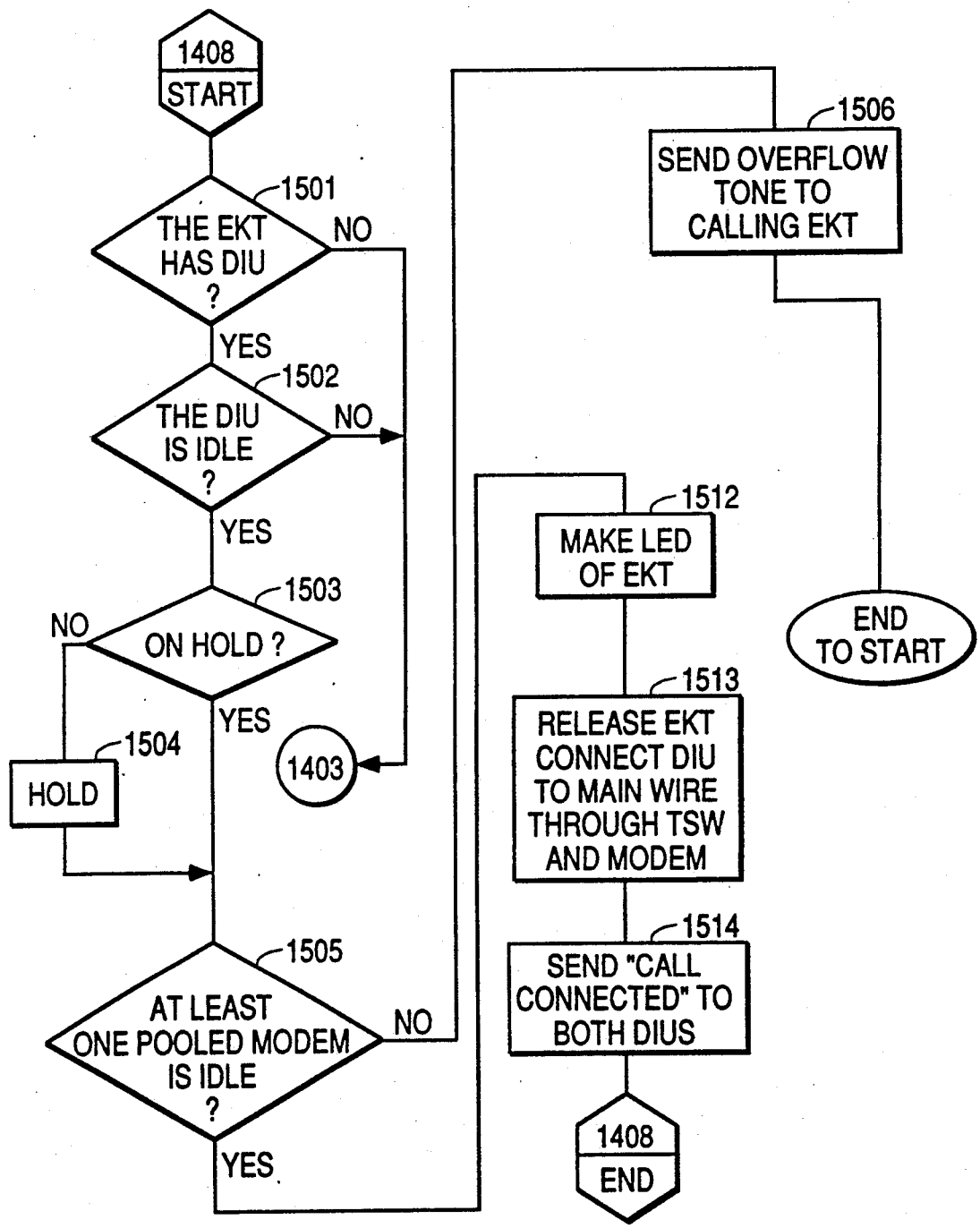
FIG. 15 shows in more detail step 1408 of the flow chart shown in FIG. 14.

When CPU 192 receives "start of data communication call" (step 1403), it processes step 1408 which includes the sub-steps shown in FIG. 15. With respect to FIG. 15, CPU 192 refers to tables 7 and 3 to determine whether EKT 20 has a DIU and whether the DIU is idle (steps 1501 and 1502). If EKT 20 does not have a DIU or if DIU 32 is not idle, CPU would return to step 1403 nullifying the depression of DIU key 277 (step 1501 or 1502). Assuming that DIU 32 is now idle, CPU 192 next determines whether EKT 20 is "on hold" status (step 1503). If not, CPU 192 changes DN state in the same manner as control data of "hold" is transmitted from EKT 20 (step 1504). Then, CPU 192 determines whether at least one pooled modem is idle (step 1505). If all the pooled modems are not idle, CPU 192 processes step 1506 which includes the sub-steps shown in FIG. 9 as described before. When at least one pooled modem is idle, CPU 192 selects one among them, e.g., modem 60 and changes the DN state of the DIU 32 and the DN state of DIU 62 side of line circuit 160 to "connected", and writes the using DN and the other party's DN of them in tables 5 and 6. Also, CPU 192 changes the DN state of the pooled modem 60 side of line circuit 160 to "connected", stores the using DN and the other party's DN (the DN for main wire 76) in tables 5 and 6, and re-stores the other party's DN regarding line circuit 170 for main wire 76 from the DN of EKT 20 to the DN of modem 60 side of line circuit 160. Further, CPU 192 changes the DN state and the PN state of EKT 20 to "idle", and changes or maintains all the PN status of relevant units other than EKT 20 to "busy". Thereafter, CPU 192 processes the required output process corresponding to steps 1512 through 1514. Namely, CPU 192 sends control data to cause LED 297 corresponding DIU key 277 to make continuously to EKT 20 based on the PN state and DN state of related DIU 32 (step 1512). CPU 192 controls TSW 182 to connect line circuit 170 for main wire 76 and the pooled modem 60 side of line circuit 160, and to connect DIU 32 and DIU 62 to line circuit 160, thereby DIU 32 and main wire 76 are interconnected through TSW 182, DIU 62, modem 60 and TSW 182 (step 1513). CPU 192 further sends control data representing "call connected" to DIUs 32 and 62 (step 1514). In this way the connection between DTE 30 and the other party's DTE 70 is completed.

In this case, when the connection is completed, EKT 20 is disconnected from the main wire, based on its DN state described above. Thereafter, CPU 192 maintains the connection unless it receives control data representing "finish of data communication call", "non-signal continued", "clear request" or "main wire released" (steps 1409, 1410, 1411 or 1412). If CPU 192 receives any one, it processes step 1413 including the sub-steps shown in FIG. 16, in basically the same manner as the steps shown in FIG. 11.

Thus, it is possible to have the related DIU connected to the main wire through the progression process regarding the connection between the EKT and the main wire. This transition of the connection is performed by simple operation, i.e., depression of the DIU key, and does not require a dial operation.

Figure 17:
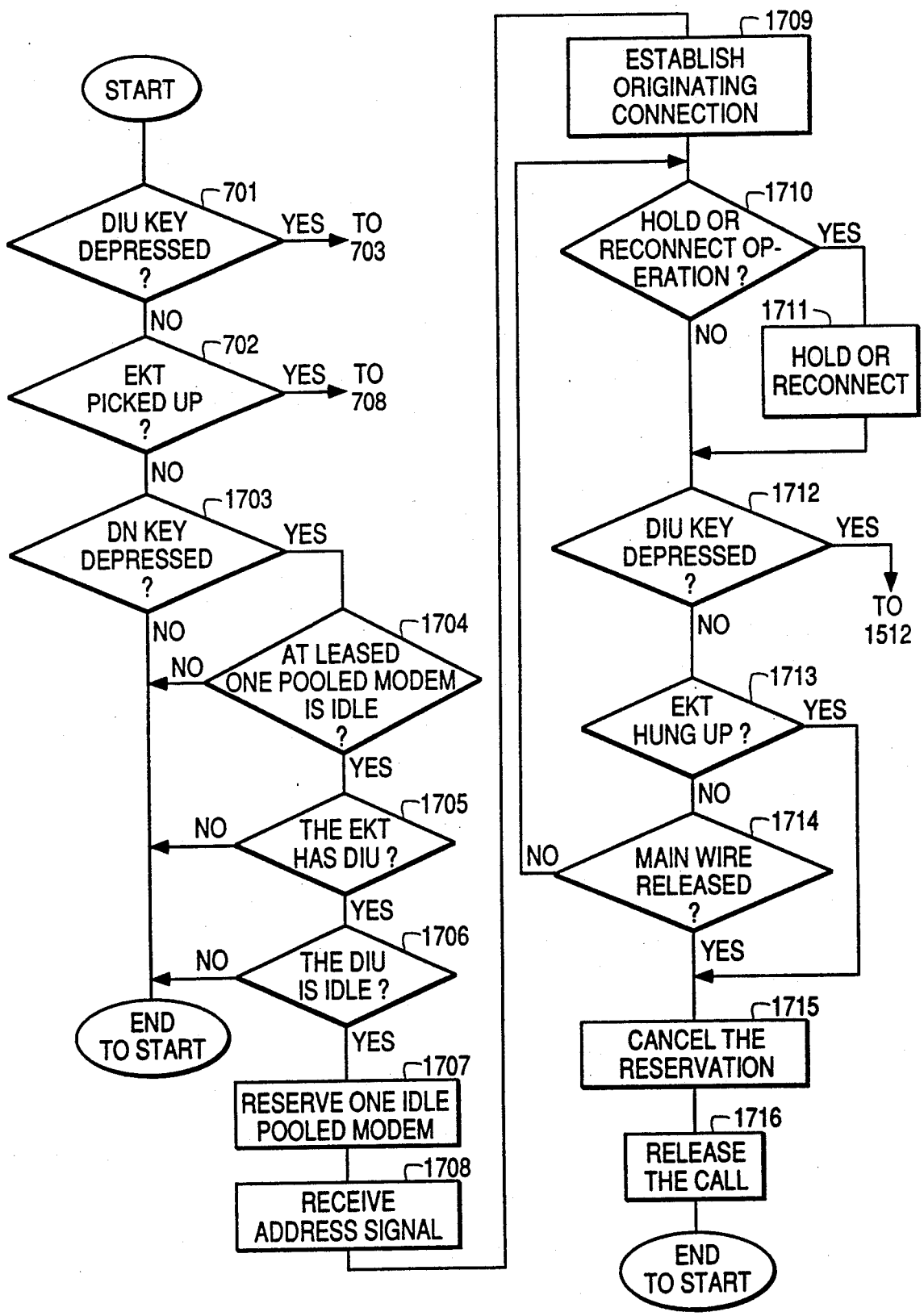
FIG. 17 is a flow chart of a further computer program executed by CPU 192 shown in FIG. 8.

FIGS. 17 and 18 show the main portion of computer programs for an alternative of the invention. In this alternative embodiment, it is possible to reserve the pooled modem, and to express the condition of usage of the pooled modem, e.g. "all are used" or "at least one is idle". It would happen to occur that when the user depressed the DIU key after the connection of the EKT and the main wire the DIU can not be connected because all the pooled modems had been used by others. According to this alternative, such occurrence is prevented. The function of reservation can be utilized along with the embodiment described before. FIG. 17 is regarded as that step 1703 and the following steps are added to the computer programs shown in FIG. 7 through 16. The computer programs shown in FIG. 17 are executed by CPU 192 along with that shown in FIG. 18, and in time sharing fashion. With respect to FIG. 18, CPU 192 regularly examines table 1 and 3 to determine whether at least one of the PNs to which modems are connected is idle (step 1801). When at least one is idle, CPU 192, sends control data to cause the LEDs for the DN keys of all the EKTs which have the DIU to break to all the EKTs (step 1802). On the contrary, when no modem is idle CPU 192 send control data to cause the LEDs to light (step 1803).

After the confirmation of the off status of LED 296 corresponding to DN key 276 the user of the EKT, e.g. EKT 20 depresses DN key 276. With respect to FIG. 17, CPU 192 recognizes the depression of DN key 276 (step 1703). CPU 192 reserves one of the idle pooled modem, e.g., modem 60, unless no pooled modem is idle, the EKT does not have a DIU, or the DIU is not idle (steps 1704 through 1707). If not, CPU 192 ends the process to start again, nullifying the depression of the DN key. The reservation is performed in such a manner that CPU 192 writes "10" in the PN state table, i.e., table 3 in the address corresponding to the reserved PN to which the reserved modem is connected. CPU 192 next processes step 1708 for receiving the address signal in the same manner as step 708 in FIG. 7. Upon receipt of number "0", CPU 192 starts to process step 1709 for originating connection in the same manner as step 1401. Thereafter, CPU 192, executes steps 1710 through 1714 in the same manner as steps 1402 through 1406. When DIU key 277 is depressed, CPU 192 jumps to step 1512 to executes the steps shown in FIG. 15 for connecting DIU 32 to main wire 76 through DIU 62 and modem 60. The PN state of modem 60, which have been reserved, is re-written to "0", i.e. "busy".

If CPU 192 determines that EKT 20 was hung-up (step 1713) or that main wire 76 was released (step 1714) in FIG. 17, CPU 192 then re-writes the PN state of the reserved modem to "idle" (step 1715), and executes the process of step 1716 for releasing the call.

FIG. 19 shows the computer programs for registering and erasing the information regarding tables 1, 2, 7 and 8, i.e., the information regarding the PN-DN correspondence, the kind of terminals connected to every PN, allotment of the functions to every function keys of EKTs and the correspondence of the PN of the EKT and the PN of the DIU and so forth. When it is required to newly register, to change or to delete, typewriter 80 is utilized. With respect to FIG. 19, CPU 192 regularly examines whether typewriter 80 is connected (step 1901). If it is, CPU 192 determines whether the CR (carriage return) key of typewriter 80 is depressed (step 1902). If the CR key is depressed, CPU 192 continues to store successive input of data regarding the above information. If the CR key is depressed again or the DEL (delete) key is depressed, CPU 192 registers the input data in the respective tables after the arranging in the designated format (step 1906). When the DEL key is depressed, CPU 192 deletes the information corresponding the input data (step 1907).

While in the foregoing specification, several embodimdents or alternatives of the invention have been set forth for the purpose of making a complete disclosure, it will be apparent to those skilled in the art that numerous changes may be made without departing from the spirit and principals of the invention. The present invention is only limited by the scope of the appended claims.

We claim:

1. In a switching system having an exchange with an exchanging switch, a plurality of telephone sets coupled to said exchange and a plurality of data terminals coupled to said exchange, the improvement comprising:
   storing means provided in said exchange for storing association information associating each of at least two of said telephone sets with one of at least two of said data terminals respectively;
   a beginning key provided in each of said telephone sets for a data call using an associate data terminal;
   a dial key provided in each of said telephone sets for transmitting to said exchange data call beginning control data and an address signal in response to depression of said beginning key and said dial key respectively; and
   controlling means provided in said exchange for controlling the connection between a data terminal associated with a first telephone set which has transmitted data call beginning control data and an address signal and the data terminal designated by the address signal with reference to the stored associated information when said data call beginning control data and the address signal are transmitted from said first telephone set.

2. The switching system of claim 1 further comprising a directory number selection key provided in each of said telephone sets, wherein said transmitting means transmits directory number selection control data in response to depression of said directory number selecting key, said controlling means control the connection between said first telephone set and a second telephone set designated by an address signal when said first telephone set has transmitted directory number selection control data and the address signal, and wherein said controlling means controls the connection between data terminals associated with said telephone sets which have been connected with reference to the stored association information when the data call beginning control data is transmitted from one of said telephone sets which have been connected.

3. The switching system of claim 1 wherein each of said telephone sets includes a light emitting device indicating the condition of data transmission by said associated data terminal.

4. The switching system of claim 1 wherein each of said telephone sets comprises a finish key for instruction regarding finish of the call for said associated data terminal, said transmitting means transmits data call finish control data when said finish key is operated, and said controlling means controls said exchanging switch to disconnect said data terminal from other data terminal when the data call finish control data is transmitted.

5. The switching system of claim 4 wherein said telephone sets include a light emitting device for expressing the condition of data transmission by said associated data terminal.

6. In a switching having an exchange with an exchanging switch, a plurality of telephone sets coupled to said exchange and a plurality of data terminals coupled to said exchange, the improvements comprising:
   storing means provided in said exchange for storing association information associating each of at least two of said telephone sets with one of at least two of said data terminals respectively;
   a beginning key provided in each of said telephone sets for transmitting to said exchange data cell beginning control data and an address signal in response to depression of said beginning key and said dial key respectively; and
   controlling means provided in said exchange for controlling the connection between a first telephone set which has transmitted data call beginning control data and an address signal and a data terminal designed by the address signal with reference to the stored association information when said data call beginning control data and the address signal are transmitted from said first telephone set,
   further comprising a directory number selection key provided in each telephone set, wherein said transmitting means transmits directory number selection control data in response to depression of said directory number selection key, said controlling means controls the connection between said first telephone set and a second telephone set designated by an address signal when said first telephone set has transmitted directory number selection control data and the address signal, and wherein said controlling means controls the connection between data terminals associated with said telephone sets which have been connected with reference to the stored association information when the data call beginning control data is transmitted from one of said telephone sets which have been connected, and
   further comprising a modem coupled to said exchange for data transmission and a communication line for coupling said exchange and another exchange coupling another data terminal thereto, wherein said controlling means controls the connection between a first data terminal associated with the first telephone set and said communication line through said exchanging switch and said modem when the directory number selection control data, the address signal and the data call beginning control data are transmitted from said first telephone set in sequence.

7. The switching system of claim 6 wherein each of said telephone sets comprises a finish key for instruction regarding finish of the call for said associated data terminal, said transmitting means transmits data call finish control data when said finish key is operated, and said controlling means controls said exchanging switch to disconnect said calling data terminal from said communication line when the data call finish control data is transmitted.

8. The switching system of claim 6 further comprising modem reserving key provided in said telephone sets and reserving means provided in said exchange for reserving said modem for the subscriber of said telephone set when modem reservation control data is transmitted from said telephone set in response to depression of said modem reserving key.

9. In a switching system having an exchange with an exchanging switch, a plurality of telephone set coupled to said exchange and a plurality of data terminals coupled to said exchange, a call control method comprising the steps of:

providing said exchange with association information associating each of at least two of said telephone sets with one of at least two of said data terminals respectively;

providing each of said at least two telephone sets with a beginning key for operation of a data call using its associated data terminal and a dial key;

transmitting call beginning control data and an address signal to said exchange from a first telephone set in response to depression of said beginning key and said dial key of said first telephone set; and said exchange controlling the connection between said data terminal associated with said telephone set having transmitted the call beginning control data and the address signal and another data terminal designated by the address signal upon receipt of the call beginning control data and the address signal.

10. The method of claim 9 wherein the step of said exchange controlling the connection comprises the step of determining that the calling data terminal is the terminal having transmitted the call beginning control data and that the called data terminal is the data terminal designated by the address signal.

11. In a switching system having a first exchange with an exchanging switch, a plurality of telephone sets coupled to said exchanged, a first data terminal coupled to said first exchange, a communication line which couples said first exchange and a second exchange coupling a second data terminal thereto, and a modem, a call control method comprising the steps of:

providing said first exchange with association information associating said telephone sets with said first data terminal;

providing each of said telephone sets with a beginning key for operation of a data call using the first data terminal, with a directory number selecting key and with a dial key;

transmitting directory number selection control data and an address signal to said first exchange from a first telephone set in response to depression of said directory number selecting key and said dail of said first telephone set;

said first exchange controlling the connection between said first telephone set having transmitted the directory number selection control data and the address signal and said communication line upon receipt of the directory number selection control data and the address signal;

transmitting data call beginning control data to said first exchange from said first telephone set in response to depression of said beginning key of said first telephone set; and said exchange disconnecting said first telephone set from said communication line through said modem upon receipt of the data call beginning control data.

12. In a switching system having a first exchange with an exchanging switch, a plurality of telephone sets coupled to said exchange, a first data terminal coupled to said first exchange, a communication line which couples said first exchange and a second exchange coupling a second data terminal thereto, and a modem, a call control method comprising the steps of:

providing said first exchange with association information associating said telephone sets with said data terminal;

providing each of said telephone sets with a beginning key for operation of a data call using the first data terminal, with a directory number key and with a dial key;

transmitting directory number selection control data and an address signal to said first exchange from a first telephone set in response to depression of said directory number selecting key and said dial key of said first telephone set;

said first exchange controlling the connection between said first telephone set having transmitted the directory number selection control data and the address signal and said communication line upon receipt of the directory number selection control data and the address signal;

transmitting data call beginning control data to said exchange from said first telephone set in response to depression of said beginning key of said first telephone set;

said first exchange disconnecting said first telephone set from said communication line, and said first exchange connecting said data terminal associated with said telephone sets to said communication line through said modem upon receipt of the data call beginning control data, and wherein the step of said first exchange connecting comprises sub-steps of connecting said data terminal associated with said telephone sets to one port of said modem through one path of said exchanging switch and connecting the other port of said modem to said communication line through another path of said exchanging switch.

13. In a switching system having a first exchange with an exchanging switch, a plurality of telephone sets coupled to said first exchange, a first data terminal coupled to said exchange, a communication line which couples said first exchange and a second exchange coupling a second data terminal thereto, and a modem, a call control method comprising the steps of:

providing said first exchange with association information associating said telephone sets with said first data terminal;

providing each of said telephone sets with a beginning key for operation of a data call using, the first data terminal, with a directory number selecting and moderm reserving key and with a dial key;

transmitting directory number selection and modem reservation control data and an address signal to said first exchange from a first telephone set in response to depression of said directory number selecting and modem reserving key and said dial key of said first telephone set;

said first exchange reserving said modem for the subscriber of said first telephone set having transmitted directory number selection and modem reservation control data, and controlling the connection between said first telephone set and said communication line upon receipt of the directory number selection and modem servation control data and the address signal;

transmitting data call beginning control data to said first exchange from said first telephone set in response to depression of said beginning key of said first telephone set; and said first exchange disconnecting said first telephone set from said communication line, and connecting said data terminal associated with said telephone sets to said communication line through said reserved modem upon receipt of the data call beginning control data.

14. The call control method of claim 13 wherein the step of said exchange connecting comprises sub-steps of connecting said data terminal associated with said telephone set to one port of said modem through one path of said exchanging switch and connecting the other port of said modem to said communication line through another path of said exchanging switch.

* * * * *